United States Patent
Yonezawa et al.

(10) Patent No.: US 7,377,505 B2
(45) Date of Patent: May 27, 2008

(54) CLAMPING APPARATUS AND CLAMPING SYSTEM

(75) Inventors: Keitaro Yonezawa, Kobe (JP); Yosuke Haruna, Kobe (JP)

(73) Assignee: Kosmek, Ltd., Hyogo (JP)

( * ) Notice: Subject to any disclaimer, the term of this patent is extended or adjusted under 35 U.S.C. 154(b) by 138 days.

(21) Appl. No.: 10/569,130

(22) PCT Filed: Aug. 10, 2004

(86) PCT No.: PCT/JP2004/011471

§ 371 (c)(1),
(2), (4) Date: Feb. 22, 2006

(87) PCT Pub. No.: WO2005/018869

PCT Pub. Date: Mar. 3, 2005

(65) Prior Publication Data

US 2006/0261534 A1    Nov. 23, 2006

(30) Foreign Application Priority Data

Aug. 25, 2003 (JP) .............................. 2003-299560

(51) Int. Cl.
*B23Q 3/00* (2006.01)
(52) U.S. Cl. .................... 269/309; 269/48.1; 269/48.3; 269/310
(58) Field of Classification Search ............... 269/48.1, 269/48.3, 309, 310
See application file for complete search history.

(56) References Cited

U.S. PATENT DOCUMENTS

| 4,948,105 | A  | * | 8/1990 | Yonezawa .................... 269/32 |
| 5,820,118 | A  |   | 10/1998 | Craft |
| 6,390,460 | B2 | * | 5/2002 | Chupick .................... 269/48.1 |
| 6,604,738 | B2 | * | 8/2003 | Haruna ........................ 269/309 |

FOREIGN PATENT DOCUMENTS

| EP | 1 078 713 | 2/2001 |
| JP | 3-287336 | 12/1991 |
| JP | 11-19836 | 1/1999 |
| JP | 2002-331432 | 11/2002 |

* cited by examiner

*Primary Examiner*—Joseph J. Hail, III
*Assistant Examiner*—Shantese L McDonald
(74) *Attorney, Agent, or Firm*—Bacon & Thomas, PLLC

(57) ABSTRACT

A housing (15) fixed to a reference block (1) is provided with a guide hole (20) into which a plug portion (3) of a movable member (2) is allowed to be inserted. Inside this guide hole (20) is arranged an outer sleeve (21) vertically movably, and this outer sleeve (21) is advanced upward by a predetermined advancing stroke by a coned disc spring (25). An inner sleeve (31) which is allowed to fit outside the plug portion (3) is wedge-engaged with the outer sleeve (21) from above, and this inner sleeve (31) is adapted to be diametrically expandable and diametrically contractible. The inner sleeve (31) is moved vertically by an output member (36).

22 Claims, 18 Drawing Sheets

CLAMPING APPARATUS AND CLAMPING SYSTEM

TECHNICAL FIELD

The present invention relates to a clamping apparatus for fixing a movable member such as a work pallet or a work to a reference block such as a table of a machine tool, and further relates to a clamping system using this clamping apparatus.

BACKGROUND ART

This kind of clamping apparatus is conventionally described in Patent Document 1 for example. The clamping apparatus presented in the Patent Document 1 is constituted in such a way that a plurality of rotary clamps are arranged around a work placed on a work pallet, and clamping member of the rotary clamps press the work from above.

Patent Document 1: U.S. Pat. No. 5,820,118

SUMMARY OF THE INVENTION

Problems to be Solved by the Invention

However, the clamping apparatus described in the Patent Document 1 has problems that since the plurality of rotary clamps are arranged around the work, it is difficult to machine side surfaces of the work, further that an upper surface of the work cannot be machined at the pressing points of the clamping members.

It is an object of the present invention to provide a new clamping apparatus which does not obstruct accessing (namely, machining/utilizing) each surface of a movable member such as a work and a work pallet, and a clamping system using the clamping apparatus.

Means for Solving the Problems and Effects

The problems to be solved by the present invention are as described above, next, explanation for means for solving the problems and effects thereof will be made.

[1] In order to accomplish the objective mentioned above, a first aspect of the present invention is constituted as follows, for example as illustrated in FIG. 2A, and FIG. 4, FIG. 5, FIG. 7, FIG. 9, FIG. 10A, FIG. 13, FIG. 14, FIG. 15A, FIG. 17, FIG. 18, FIG. 20A, FIG. 21A, FIG. 24, FIG. 26, FIG. 28 and FIG. 29 respectively.

A guide hole 20 into which a plug portion 3 of a movable member 2 is allowed to be inserted is opened in a leading end portion of a reference block 1. An outer engaging member 21 is arranged inside the guide hole 20. An inner engaging member (31, 72) which is diametrically expandable and diametrically contractible is arranged inside the outer engaging member 21, the inner engaging member (31, 72) is axially wedge-engaged with the outer engaging member 21, and the inner engaging member (31, 72) which is in the wedge-engaged state is adapted to be movable for locking toward a base end and in such a direction as to contract diametrically. An output member 36 is inserted into the reference block 1 axially movably, and the output member 36 is connected to either one of the inner engaging member (31, 72) and the outer engaging member 21. The output member 36 is allowed to be connected to a drive means D.

It is noted that both an automatic drive means using an actuator such as a fluid pressure cylinder or an electric motor and a human-powered drive means can be employed as the drive means D.

The first aspect of the present invention operates as follows, for example as illustrated in FIG. 2A and FIG. 4 (or FIG. 5, FIG. 7, FIG. 9, FIG. 10A, FIG. 13, FIG. 14, FIG. 15A, FIG. 17, FIG. 18, FIG. 20A, FIG. 21A, FIG. 24, FIG. 26, FIG. 28 and FIG. 29).

In a release state illustrated in FIG. 2A, the drive means D has moved the output member 36 toward a leading end (upward), and the inner engaging member 31 (72) has moved toward the leading end (upward) and has diametrically expanded.

To fix the movable member 2 on the reference block 1, the plug portion 3 is fitted inside the inner engaging member 31, and then the output member 36 is moved toward the base end (downward) by the drive means D, by which the inner engaging member 31 and the outer engaging member 21 are wedge-engaged with each other.

Then, first, the inner engaging member 31 (72) diametrically contracts via the outer engaging member 21, and the inner engaging member 31 comes into contact with an outer peripheral surface of the plug portion 3. Successively, when the movement of the inner engaging member 31 toward the base end is blocked, the inner engaging member 31 strongly wedge-engages with the outer engaging member 21 and diametrically contracts, and the inner engaging member 31 comes into strong and close contact with the outer peripheral surface of the plug portion 3. Thereby, as illustrated in FIG. 4, the output member 36 strongly presses a supported surface 2a of the movable member 2 toward a support surface 1a of the reference block 1 via the inner engaging member 31 which has been brought into strong and close contact with the outer peripheral surface of the plug portion 3.

It is noted that, in a case that the support surface 1a of the reference block 1 and the supported surface 2a of the movable member 2 has been in substantially perfect contact with each other and the supported surface 2a has been received by the support surface 1a before the locking movement mentioned above, the inner engaging member 31 (72) operates as follows during the locking movement.

After coming into close contact with the outer peripheral surface of the plug portion 3, the inner engaging member 31 moves toward the base end while sliding with respect to the plug portion 3 of the movable member 2 received by the reference block 1. Then, as described above, when the movement of the inner engaging member 31 toward the base end is blocked, the inner engaging member 31 comes into strong and close contact with the outer peripheral surface of the plug portion 3, and this inner engaging member 31 strongly presses the movable member 2 toward the reference block 1.

On the other hand, in a case that a gap is left between the support surface 1a of the reference block 1 and the supported surface 2a of the movable member 2 at the start of the locking movement for some reason, the inner engaging member 31 (72) operates as follows during the locking movement.

After coming into close contact with the outer peripheral surface of the plug portion 3, the inner engaging member 31 in the close contact state moves the movable member 2 toward the reference block 1 via the plug portion 3, and bring the supported surface 2a into contact with the support surface 1a. Then, as described above, when the movement of the inner engaging member 31 toward the base end is blocked, the inner engaging member 31 comes into strong and close contact with the outer peripheral surface of the plug portion 3, and the inner engaging member 31 strongly presses the movable member 2 toward the reference block 1.

The first aspect of the present invention is constituted and operates as described above, so that the first aspect of the present invention exhibits the following effect.

It becomes easier to access five surfaces other than the supported surface among six surfaces of the movable member. Therefore, for example, in a case that the movable member is a work, five surfaces can be simultaneously machined by one clamping operation. In addition, in a case that the movable member is a work pallet, the effective use area of the work pallet can be significantly increased.

[2] According to a second aspect of the present invention, in the first aspect of the present invention, as illustrated in FIG. 2A, FIG. 5, FIG. 7, FIG. 9, FIG. 13, FIG. 14, FIG. 15A, FIG. 17, FIG. 18, FIG. 21A, FIG. 24, FIG. 26 and FIG. 28 for example, an annular inner sleeve 31 is employed as the inner engaging member. In this case, a mechanically simple and compact inner engaging member can be obtained.

[3] According to a third aspect of the present invention, in the first aspect of the present invention, as illustrated in FIG. 10A, FIG. 20A and FIG. 29 for example, the following structure is employed.

Namely, a plurality of pressing members 72 arranged circumferentially at intervals are employed as the inner engaging member. An annular socket 71 into which the plug portion 3 is allowed to be inserted is arranged inside the outer engaging member 21. Each of the pressing members 72 is supported on a peripheral wall of the annular socket 71 radially movably, and each of the pressing members 72 is adapted to be movable radially outward by a return means 74. The output member 36 is connected to either one (71, 21) of the annular socket 71 and the outer engaging member 21.

With this structure, the pressing members can be greatly projected radially inward, so that even when fitting gaps between inside surfaces of the pressing members and the outer peripheral surface of the plug portion are large, proper clamping operation can be performed.

[4] According to a fourth aspect of the present invention, in the first aspect of the present invention, as illustrated in FIG. 2A, FIG. 5, FIG. 10A, FIG. 13, FIG. 14, FIG. 15A, FIG. 17, FIG. 20A, FIG. 21A, FIG. 24, FIG. 26, FIG. 28 and FIG. 29 for example, the outer engaging member 21 is adapted to be diametrically expandable and diametrically contractible. In this case, in the locking movement, while the inner engaging member is wedge-engaged with the outer engaging member, the outer engaging member diametrically expands and an outer peripheral surface of the outer engaging member comes into close contact with an inner peripheral surface of the guide hole. Therefore, the plug portion of the movable member can be bound to the reference block via the inner engaging member, the outer engaging member and the guide hole in the recited order. Thereby, a clamping apparatus having a positioning function can be provided.

[5] According to a fifth aspect of the present invention, in the first aspect of the present invention, as illustrated in FIG. 2A, FIG. 5, FIG. 7, FIG. 9, FIG. 10A, FIG. 13, FIG. 14, FIG. 15A, FIG. 17, FIG. 18 and FIG. 20A for example, the inner engaging member (31, 72) is advanced toward the leading end by an advancing means 25, and in the locking movement, the inner engaging member (31, 72) moves toward the base end against the advancing means 25 while diametrically contracting. In this case, due to an action of the advancing means, it becomes possible to drive the inner engaging member toward the base end after the inner engaging member diametrically contracts and comes into close contact with the outer peripheral surface of the plug portion, so that a strong locking force can be secured. It is noted that the advancing means 25 is only required to advance the inner engaging member 31 (72) toward the leading end, and cases where the advancing means 25 directly advances the inner engaging member 31 (72) and the advancing means 25 indirectly advances the inner engaging member 31 (72) via another member such as the outer engaging member 21 are possible. As the advancing means 25, an elastic member such as a spring or rubber, a fluid pressure cylinder and the like are available.

[6] According to a sixth aspect of the present invention, in the first aspect of the present invention, as illustrated in FIG. 21A, FIG. 24, FIG. 26, FIG. 28 and FIG. 29, the outer engaging member 21 is adapted to be diametrically expandable and diametrically contractible, an annular gap 92 is formed between the guide hole 20 and the outer engaging member 21, and in the locking movement, the inner engaging member (31, 72) diametrically expands the outer engaging member 21 and moves toward the base end while diametrically contracting. In this case, the outer engaging member has the function of the advancing means of the fifth aspect of the present invention, so that the exclusive advancing means can be omitted, therefore, a mechanically simple clamping apparatus can be obtained.

[7] According to a seventh aspect of the present invention, in the first aspect of the present invention, as illustrated in FIG. 2A, FIG. 5, FIG. 7, FIG. 9, FIG. 10A, FIG. 13, FIG. 14, FIG. 21A, FIG. 24, FIG. 26, FIG. 28 and FIG. 29 for example, the inner engaging member (31, 71) is wedge-engaged with the outer engaging member 21 from the leading end side. With this structure, a strong locking force can be secured during the locking movement.

[8] According to an eighth aspect of the present invention, in the first aspect of the present invention, as illustrated in FIG. 15A, FIG. 17, FIG. 18 and FIG. 20A for example, the inner engaging member (31, 71) is wedge-engaged with the outer engaging member 21 from the base end side. With this structure, a strong locking force can also be secured during the locking movement.

[9] According to a ninth aspect of the present invention, in the first aspect of the present invention, as illustrated in FIG. 2A, FIG. 10A, FIG. 13, FIG. 14, FIG. 15A, FIG. 20A, FIG. 21A, FIG. 26, FIG. 28 and FIG. 29, etc. for example, substantially the entire circumference of an outer peripheral surface of the outer engaging member 21 is allowed to come into close contact with an inner peripheral surface 24 of the guide hole 20. In this case, the positioning accuracy of the positioning function further increases.

[10] According to a tenth aspect of the present invention, in the first aspect of the present invention, as illustrated in FIG. 2A, FIG. 5, FIG. 10A, FIG. 13, FIG. 14, FIG. 15A, FIG. 17, FIG. 20A, FIG. 21A, FIG. 24, FIG. 26, FIG. 28 and FIG. 29 for example, a peripheral wall of the outer engaging member 21 is provided with at least one slit 22 so that the outer engaging member 21 is diametrically contractible by its own elastic restoring force. In this case, a mechanically simple and compact outer engaging member can be obtained.

[11] According to an eleventh aspect of the present invention, in the first aspect of the present invention, as illustrated in FIG. 6, FIG. 17 and FIG. 24 for example, a pair of projections 62, 62 radially facing each other are provided on at least any of an inner periphery of the guide hole 20, an outer periphery or an inner periphery of the outer engaging member 21 and an outer periphery or an inner periphery of the inner engaging member 31, and escape grooves 63, 63 are formed between the projections 62, 62. In this case, axial misalignment between the axis of the plug portion and the axis of the guide hole can be absorbed by the escape grooves.

[12] According to a twelfth aspect of the present invention, in the first aspect of the present invention, as illustrated in FIG. 2A, FIG. 5, FIG. 7, FIG. 9, FIG. 10A, FIG. 13, FIG. 14, FIG. 15A, FIG. 17, FIG. 18, FIG. 20A, FIG. 21A, FIG. 24, FIG. 28 and FIG. 29 for example, an inner peripheral surface 24 of the guide hole 20 is prohibited to move radially with respect to the reference block 1. In this case, the clamping apparatus having the positioning function can be easily manufactured.

[13] According to a thirteenth aspect of the present invention, in the first aspect of the present invention, as illustrated in FIG. 26 for example, an inner peripheral surface 24 of the guide hole 20 is allowed to move radially with respect to the reference block 1. In this case, axial misalignment between the axis of the plug portion and the axis of the guide hole can be absorbed by radial movements of the inner peripheral surface of the guide hole.

[14] According to a fourteenth aspect of the present invention, in the second aspect of the present invention, as illustrated in FIG. 5, FIG. 7, FIG. 9, FIG. 17, FIG. 18, FIG. 24 and FIG. 26 for example, the outer engaging member 21 is attached to at least one of the guide hole 20 and the output member 36 radially movably. In this case, axial misalignment between the axis of the plug portion and the axis of the guide hole can be absorbed by radial movements of both the outer engaging member and the inner sleeve.

[15] A fifteenth aspect of the present invention relates to a new clamping system using the clamping apparatus of the second aspect of the present invention, and is constructed as follows as illustrated in FIG. 1 through FIG. 4 for example.

Two of the plug portions 3, 3 are provided at a predetermined interval on the movable member 2. The reference block 1 is provided with a first socket means 11 and a second socket means 12 corresponding to the plug portions 3, 3. Each of the socket means 11 and 12 includes the guide hole 20, the outer engaging member 21 and the inner sleeve 31. The first socket means 11 is constituted in such a way that substantially the entire circumference of an outer peripheral surface of the outer engaging member 21 is allowed to come into close contact with an inner peripheral surface 24 of the guide hole 20. The second socket means 12 is constituted in such a way that a pair of projections 62, 62 radially facing each other are provided on at least any of an inner periphery of the guide hole 20, an outer periphery or an inner periphery of the outer engaging member 21 and an outer periphery or an inner periphery of the inner sleeve 31, and escape grooves 63, 63 are formed between the projections 62, 62.

In the clamping system constructed as described above, a mechanically simple structure that can accurately position and fix the movable member with respect to the reference block can be obtained.

[16] A sixteenth aspect of the present invention relates to a new clamping system using the clamping apparatus of the third aspect of the present invention, and is constructed as follows as illustrated in FIG. 1 and FIG. 10A for example.

Two of the plug portions 3, 3 are provided at a predetermined interval on the movable member 2. The reference block 1 is provided with a first socket means 11 and a second socket means 12 corresponding to the plug portions 3, 3. Each of the socket means 11 and 12 includes the guide hole 20, the outer engaging member 21, the annular socket 71 and the plurality of pressing members 72. The first socket means 11 is constituted in such a way that substantially the entire circumference of an outer peripheral surface of the outer engaging member 21 is allowed to come into close contact with an inner peripheral surface 24 of the guide hole 20 and that three or more of the pressing members 72 are arranged circumferentially at intervals. The second socket means 12 is constituted in such a way that two of the pressing members 72 are arranged so as to radially face each other.

In the clamping system constructed as described above, a mechanically simple structure that can accurately position and fix the movable member with respect to the reference block can be obtained.

[17 and 18] According to a seventeenth aspect of the present invention, in the fifteenth aspect of the present invention, and according to an eighteenth aspect of the present invention, in the sixteenth aspect of the present invention, as illustrated in FIG. 1 for example, the movable member 2 is provided with at least another plug portion 3, and the reference block 1 is provided with a third socket means 13 to be exclusively used for locking corresponding to said another plug portion 3. With this structure, the third socket means can strongly fix the movable member to the reference block.

[19] According to a nineteenth aspect of the present invention, in the seventeenth aspect of the present invention, as illustrated in FIG. 7 and FIG. 18, etc. for example, the third socket means 13 includes the guide hole 20, the outer engaging member 21 and the inner sleeve 31, and the outer engaging member 21 is attached to at least one of the guide hole 20 and the output member 36 radially movably. With this structure, absorbing axial misalignment between the axis of the plug portion and the axis of the guide hole by radial movements of both the outer engaging member and the inner sleeve can be consistent with securing a strong locking force.

[20] According to a twentieth aspect of the present invention, in the eighteenth aspect of the present invention, the third socket means 13 includes the guide hole 20, the outer engaging member 21 and the plurality of pressing members 72, and the outer engaging member 21 is attached to the guide hole 20 radially movably. In this case, absorbing axial misalignment between the axis of the plug portion and the axis of the guide hole by radial movements of both the outer engaging member and the pressing members can be consistent with securing a strong locking force.

[21] According to a twenty-first aspect of the present invention, in the seventeenth aspect of the present invention as illustrated in FIG. 26 for example, the third socket means 13 includes the guide hole 20, the outer engaging member 21 and the inner sleeve 31, and the inner peripheral surface 24 of the guide hole 20 is allowed to move radially with respect to the reference block 1. With this structure, absorbing axial misalignment between the axis of the plug portion and the axis of the guide hole by radial movements of the inner peripheral surface of the guide hole can be consistent with securing a strong locking force.

[22] According to a twenty-second aspect of the present invention, in the eighteenth aspect of the present invention, the third socket means 13 includes the guide hole 20, the outer engaging member 21 and the plurality of pressing members 72, and the inner peripheral surface 24 of the guide hole 20 is allowed to move radially with respect to the reference block 1. With this structure, absorbing axial misalignment between the axis of the plug portion and the axis of the guide hole by radial movements of the inner peripheral surface of the guide hole can be consistent with securing a strong locking force.

BRIEF DESCRIPTION OF THE DRAWINGS

FIG. 1 through FIG. 8 show a first embodiment of the present invention.

FIG. 1 is a schematic view showing principles of a clamping system using the present invention, and is a cross sectional view of the clamping system;

FIG. 3 is a sectional view indicated by the arrow 3-3 in FIG. 2A, showing a positioning mechanism provided in the clamping apparatus;

FIG. 4 is an elevational sectional view of the clamping apparatus in a locked state;

FIG. 5 is an elevational sectional view of a clamping apparatus having another positioning mechanism, and this view is similar to FIG. 2A;

FIG. 6 is a view similar to FIG. 3, showing the positioning mechanism of the clamping apparatus in FIG. 5;

FIG. 7 is a view similar to FIG. 2A, showing another clamping apparatus of the clamping system;

FIG. 8 is a view similar to FIG. 3, showing a positioning mechanism of the clamping apparatus in FIG. 7.

FIG. 10A is a view similar to FIG. 2A;

FIG. 10B is a plan view of the clamping apparatus, and this view is similar to FIG. 2B;

FIG. 11 is an enlarged view of a cross sectional view of a main part of FIG. 10A, showing a return means of a pressing member;

FIG. 15A is a view similar to FIG. 2A;

FIG. 15B is a view similar to FIG. 2B;

FIG. 16 is a view similar to FIG. 3, showing a positioning mechanism provided in the clamping apparatus;

FIG. 20A is a view similar to FIG. 10A; and

FIG. 20B is a view similar to FIG. 10B.

FIG. 21A through FIG. 23 show a clamping apparatus of a sixth embodiment of the present invention.

FIG. 21A is a view similar to FIG. 2A;

FIG. 22 is a view similar to FIG. 3, showing a positioning mechanism provided in the clamping apparatus in a released state;

FIG. 23 is a view similar to FIG. 22, showing the positioning mechanism in a locked state;

Figure 1:
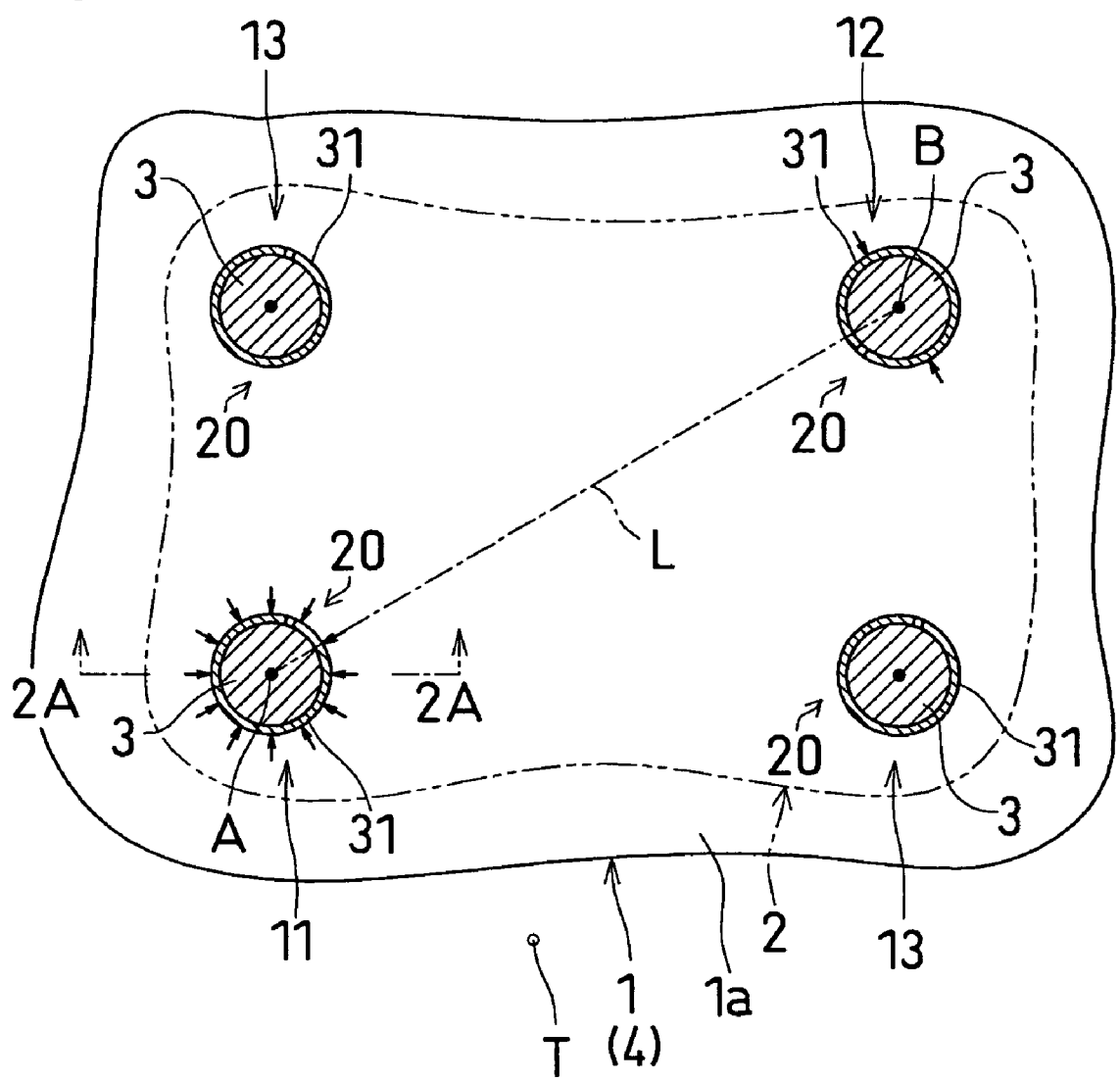

EXPLANATION OF REFERENCES 1 reference block (base plate 4 and housing 15)
2 movable member (work)
3 plug portion
11 first socket means
12 second socket means
13 third socket means
20 guide hole
21 outer engaging member (outer sleeve)
22 slit
25 advancing means (coned disc spring/urging spring)
31 inner engaging member (inner sleeve)
36 output member
51 lock means
52 release means
62 projection
63 escape groove
71 annular socket
72 inner engaging member (pressing member)
74 return means
D drive means

BEST MODE FOR CARRYING OUT THE INVENTION

First Embodiment

Explanation for a first embodiment of the present invention will be made with reference to FIG. 1 through FIG. 8. First, an entire structure of the present invention is explained with reference to FIG. 1 through FIG. 3.

Figure 2B:
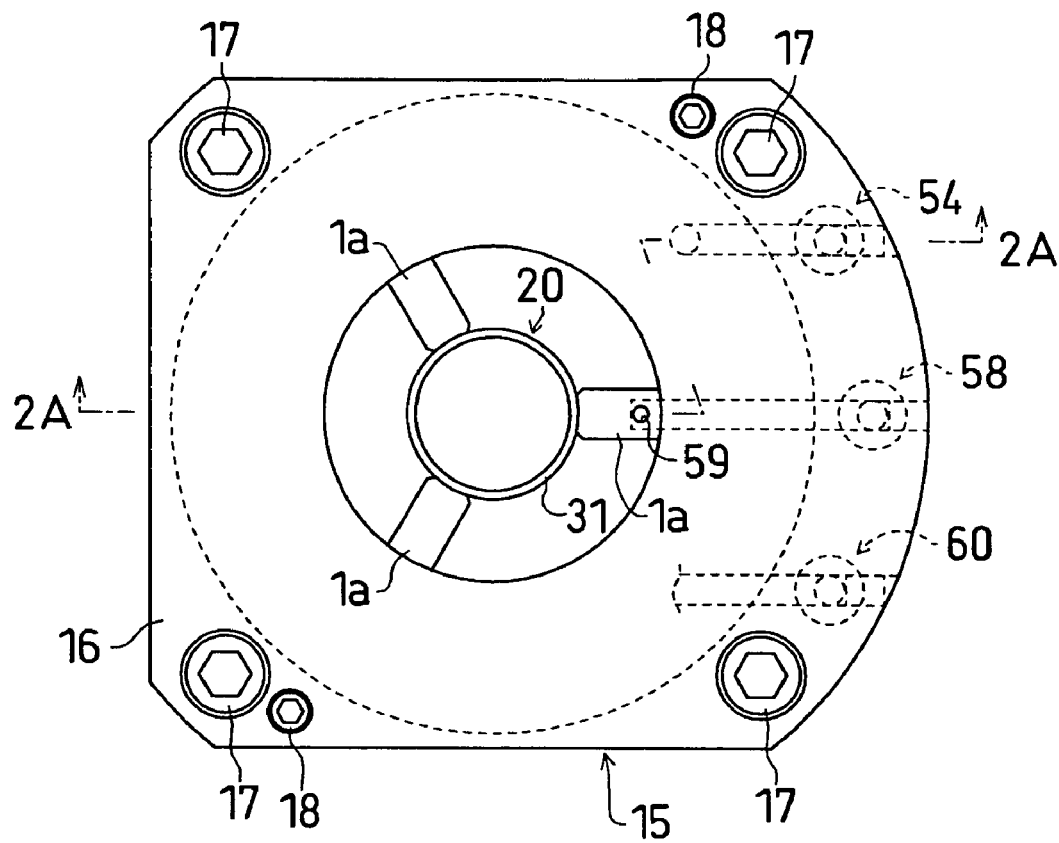
FIG. 2B is a plan view of the clamping apparatus.
Figure 2A:
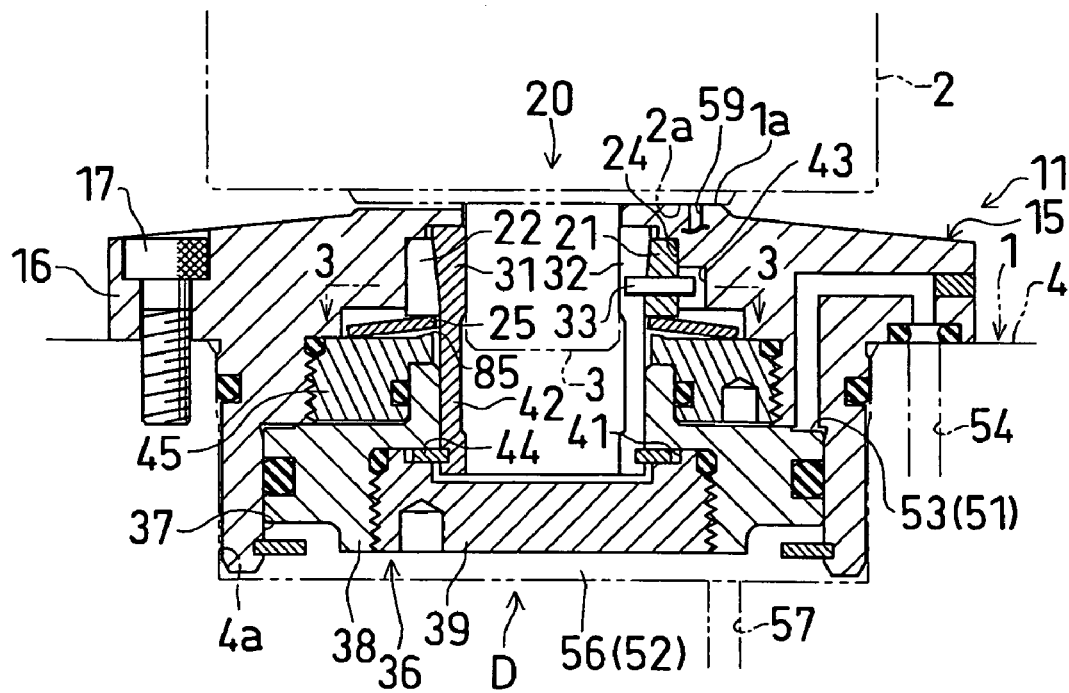
FIG. 2A is an elevational sectional view of a clamping apparatus of the clamping system in a released state, corresponding to a view indicated by the arrow 2A-2A in FIG. 1.
Figure 3:
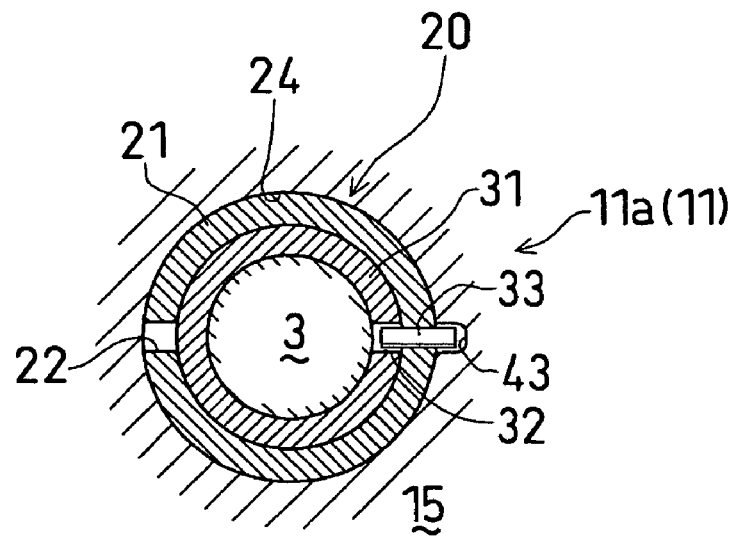
Figure 4:
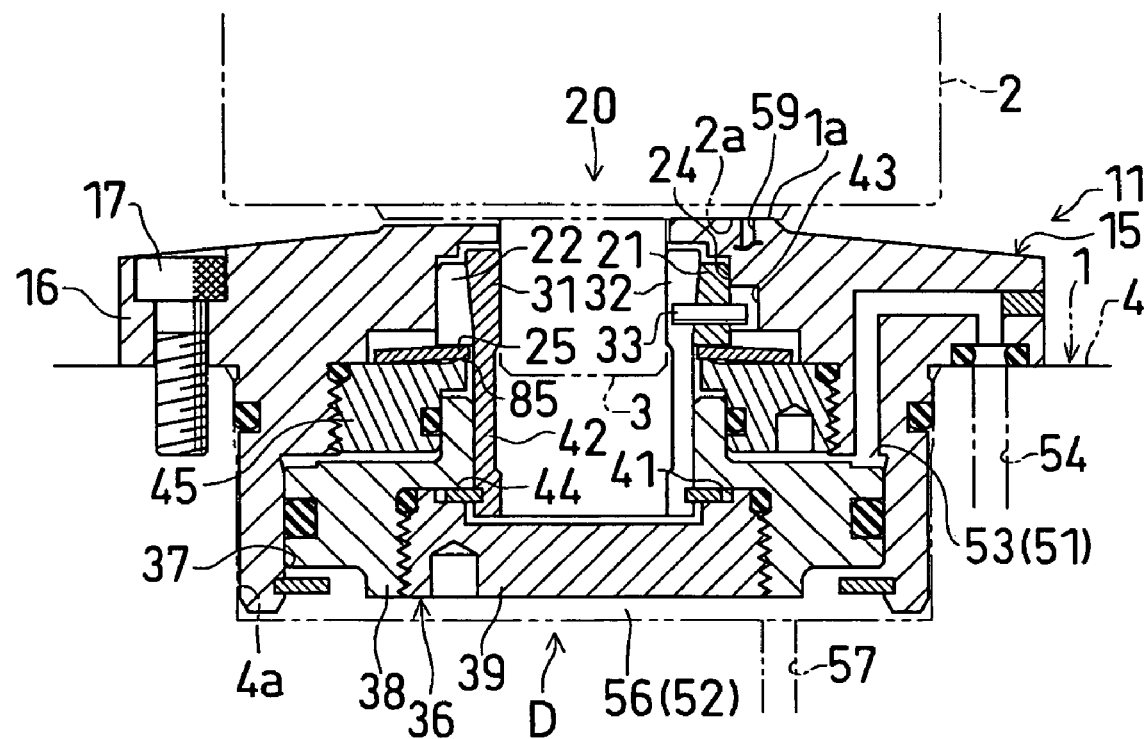

FIG. 1 is a schematic view showing principles of a clamping system using the present invention, and is a cross sectional view of the clamping system. FIG. 2A is an elevational sectional view of a clamping apparatus of the clamping system in a released state, corresponding to a view indicated by the arrow 2A-2A in FIG. 1. FIG. 2B is a plan view of the clamping apparatus. FIG. 3 is a sectional view indicated by the arrow 3-3 in FIG. 2A, showing a positioning mechanism provided in the clamping apparatus.

As illustrated in FIG. 1, the clamping system is constituted in such a way that a reference block 1 is placed on a table T of a machine tool, and a support surface 1a of the reference block 1 receive a supported surface 2a (not shown in FIG. 1) of a work pallet 2 as a movable member. As illustrated by the chained line in FIG. 2A, from the supported surface 2a of the work pallet 2 is projected a plurality of cylindrical plug portions 3 downward. It is noted that four plug portions 3 are illustrated in FIG. 1.

The reference block 1 is provided with a base plate 4, and this base plate 4 is fixed to the table T. This base plate 4 is provided with both a first socket means 11 and a second socket means 12 which have a positioning function and a locking function, and is provided with two third socket means 13, 13 which have only a locking function. These socket means 11, 12, 13 and 13 correspond to the plug portions 3. Each of the four socket means 11, 12, 13 and 13 serves as a clamping apparatus respectively, and the four socket means 11, 12, 13 and 13 are arranged so as to form vertexes of a rectangle in a plan view as illustrated in FIG. 1. The first socket means 11 and the second socket means 12 are arranged diagonally, and the two third socket means 13, 13 are also arranged diagonally.

Among these socket means, as illustrated in FIG. 1, the first socket means 11 diametrically contracts an inner sleeve 31 described later toward an axis of the first socket means 11 by means of wedge-action, and bring substantially the entire circumference of an inner peripheral surface of the inner sleeve 31 into close contact with the plug portion 3, and horizontally positions the work pallet 2 to the reference block 1 via the inner sleeve 31. In detail, the work pallet 2 is positioned in such a way that an axis of the plug portion 3 coincides with an axis A of a guide hole 20 described later (see FIG. 1). Subsequently, the first socket means 11 is constituted in such a way that the first socket means 11 drives the inner sleeve 31 which is in the close contact state downward to fix the work pallet 2 to the reference block 1.

As illustrated in FIG. 1, the second socket means 12 is constituted in such a way that the second socket means 12 brings two points of a periphery of the inner sleeve 31 into close contact with the plug portion 3 by applying a diametrically contracting force to the inner sleeve 31 in such a directions substantially orthogonal to a straight line L that links the axis A of the guide hole 20 and an axis B of the guide hole 20, by which rotation of the work pallet 2 around the axis A is blocked. Subsequently, the second socket means 12 drives the inner sleeve 31 which is in the close contact state downward to fix the work pallet 2 to the reference block 1.

The third socket means 13, 13 are constituted in such a way that the inner sleeve 31 is allowed to move radially with respect to the guide holes 20 described later, and therefore, the third socket means 13, 13 do not have the horizontally positioning function mentioned above.

The first socket means 11 and the second socket means 12 have substantially the same structure except for some different points described later, and the common structure are described as follows. Namely, as illustrated in FIG. 2A, a housing 15 is accurately fitted into an installation hole 4a of the base plate 4, and a flange 16 of the housing 15 is fixed to a peripheral wall of the installation hole 4a using four tightening bolts 17 (see FIG. 2B). It is noted that reference numerals 18, 18 of FIG. 2B indicate jack bolts. The jack bolts are provided in order to remove the housing 15 from the installation hole 4a, more specifically, the jack bolts 18, 18 are screwed downward and lower ends of the bolts 18, 18 are pressed against the base plate 4 in order to remove the housing 15 from the installation hole 4a.

As illustrated in FIG. 2A and FIG. 2B, in the housing 15 is opened the circular guide hole 20. In the present embodiment, an inner peripheral surface 24 of the guide hole 20 is prohibited to move both radially and axially with respect to the housing 15. An axis of this guide hole 20 substantially coincides with an axis of the installation hole 4a. On an upper surface of the flange 16 are formed three flat support surfaces 1a. These support surfaces 1a are arranged circumferentially at the same intervals around the guide hole 20.

In addition, as illustrated in FIG. 2A, on the inner peripheral surface 24 of the guide hole 20 is fitted a collet-shaped outer sleeve (outer engaging member) 21 vertically movably within a predetermined range. In a peripheral wall of the outer sleeve 21 is formed one slit 22 extending vertically (also see FIG. 3), whereby the outer sleeve 21 is allowed to deform elastically so as to diametrically expand and diametrically contract.

The diameter of the outer sleeve 21 is set to be slightly smaller than the diameter of the inner peripheral surface 24 of the guide hole 20 in a usual/normal state (the released state of FIG. 2A) without any elastic deformation. With this structure, the outer sleeve 21 acts in such a way that substantially the entire circumference of an outer peripheral surface thereof (part other than the slit 22) comes into close contact with the inner peripheral surface 24 of the guide hole 20 when a diametrically expanding force is applied to the outer sleeve 21. Meanwhile, the outer sleeve 21 is allowed to diametrically contract by its own elastic restoring force when the diametrically expanding force is canceled.

As illustrated in FIG. 2A, into the housing 15 is screwed a screw cylinder 45, and on an upper surface of the screw cylinder 45 is arranged an advancing means composed of one coned disc spring 25. The outer sleeve 21 is urged upward by this coned disc spring 25, and an upper end of the outer sleeve 21 is received by the housing 15. It is noted that the coned disc spring (advancing means) 25 is constituted in such a way that compression more than a predetermined amount is restricted by an annular projection 85 formed on the upper surface of the screw cylinder 45.

Inside the outer sleeve 21 is arranged the inner sleeve (inner engaging member) 31 into which the plug portion 3 is allowed to be inserted. A tapered outer surface of the inner sleeve 31 has made a tapering engagement (wedge engagement) with a tapered inner surface of the outer sleeve 21 from above. Both the tapered outer surface and the tapered inner surface are formed in such a manner as to gradually narrow downward.

The inner sleeve 31 as well as the outer sleeve 21 is formed in a collet shape. Namely, in a peripheral wall of the inner sleeve 31 is formed one slit 32 extending vertically (see FIG. 3), whereby the inner sleeve 31 is allowed to elastically deform so as to diametrically expand and diametrically contract.

The inner sleeve 31 is diametrically expanded in a usual/normal state (the release state of FIG. 2A) without any elastic deformation. And the inner sleeve 31 is constituted in such a way that, when a force is applied to the inner sleeve 31 so as to diametrically contract the inner sleeve 31 and the force is canceled, the inner sleeve 31 diametrically expands by its own elastic restoring force.

It is noted that, as illustrated in FIG. 2A and FIG. 3, a stopper pin 33 is fixed to the outer sleeve 21. An outer end of the stopper pin 33 projects from the outer peripheral surface of the outer sleeve 21 and is inserted into a stop groove 43 formed in an inner wall of the guide hole 20 of the housing 15. An inner end of the stopper pin 33 is inserted into the slit 32 of the inner sleeve 31. Herein, it is preferable that a sealing member (not shown) made of rubber or the like is attached to the slit 32 of the inner sleeve 31 and/or the slit 22 of the outer sleeve 21.

As illustrated in FIG. 2A, into the housing 15 is inserted an output member 36 vertically movably. This output member 36 includes both an annular piston 38 hermetically inserted into an inner peripheral surface of a cylindrical hole 37 at a lower portion of the housing 15 and a cover 39 hermetically screwed so as to cover a cylindrical hole of the piston 38.

A cylindrical extending portion 42 extending downward from the inner sleeve 31 is inserted into the piston 38. On an outer peripheral surface of a lower end portion of the extending portion 42 is attached a retaining ring 44. This retaining ring 44 is inserted into an annular output groove 41 formed between the piston 38 and the cover 39.

Inside the housing 15 are provided both a lock means 51 and a release means 52 as a drive means D, namely, the drive means D includes both the lock means 51 and the release means 52. The lock means 51 is composed of both the piston 38 and a lock chamber 53 formed above the piston 38. The lock chamber 53 is communicatively connected to a pressurized oil supply/discharge port 54 provided for locking. The release means 52 is composed of both the piston 38 and a release chamber 56 formed below the piston 38. The release chamber 56 is communicatively connected to a pressurized oil supply/discharge port 57 provided for releasing.

In one of the three support surfaces 1a (see FIG. 2B) is opened a detection nozzle hole 59 as a seating confirmation means, and compressed air for detecting is allowed to be supplied into this detection nozzle hole 59 from an air supply port 58 (FIG. 2B). With this structure, when the supported surface 2a comes into contact with the support surface 1a, the detection nozzle hole 59 is closed, resulting in pressure rise at the detection nozzle hole 59 (the air supply port 58). By checking the pressure with an unillustrated pressure sensor or the like, it is possible to confirm whether or not the work pallet 2 has seated on the housing 15.

As illustrated in FIG. 2B, the housing 15 is provided with a blow port 60 as a cleaning means, and the blow port 60 is adapted to be supplied with a pressured fluid such as compressed air. Contact portions between the support surfaces 1a and the supported surface 2a, a fitting portion between the plug portion 3 and the inner sleeve 31 and the engaging surface between the inner sleeve 31 and the outer sleeve 21 can be cleaned using compressed air which is supplied to the blow port 60 and passes through an unillustrated passage formed inside the housing 15.

The positioning mechanism 11a of the first socket means 11 is constructed in such a way that, as illustrated in FIG. 3, substantially the entirety of the outer peripheral surface of the outer sleeve 21 is allowed to come into close contact with the inner peripheral surface (inner wall) 24 of the guide hole 20. Therefore, during the locking movement described later, the outer sleeve 21 diametrically contracts substantially the entire circumference of the peripheral wall of the inner sleeve 31 radially inward (see FIG. 1).

Next, explanation for differences between the positioning mechanism 12a of the second socket means 12 and the positioning mechanism 11a of the first socket means 11 will be made as follows with reference to FIG. 5 and FIG. 6.

Figure 5:
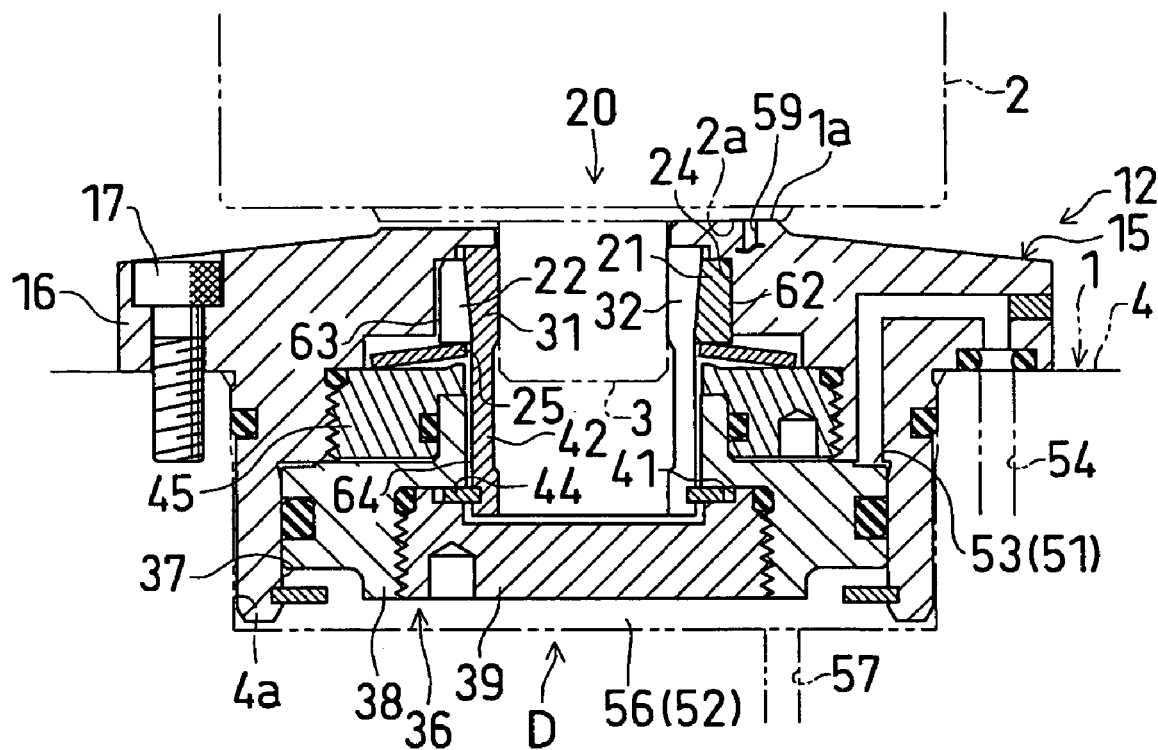

FIG. 5 is a view similar to FIG. 2A, showing a clamping apparatus as the second socket means. FIG. 6 is a view similar to FIG. 3, showing a positioning mechanism of the clamping apparatus of FIG. 5.

Figure 6:
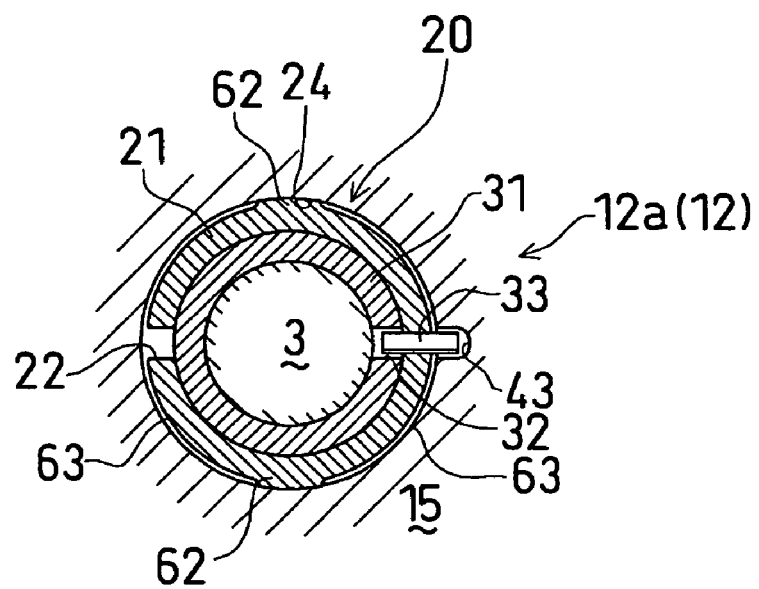

Namely, as illustrated in FIG. 6, on the outer peripheral surface of the outer sleeve 21 are provided a pair of projections 62, 62 radially facing each other, and at portions other than the portions where these projections 62, 62 are shaped are formed escape grooves 63, 63. Thereby, the projections 62, 62 generate diametrically contracting force at two points facing each other on an inner peripheral wall of the inner sleeve 31 (see FIG. 1).

It is noted that, as illustrated in FIG. 5, a radial gap 64 is formed between the extending portion 42 of the inner sleeve 31 and an inner peripheral surface of a cylindrical hole of the piston 38, and this radial gap 64 and the escape grooves 63, 63 allow the inner sleeve 31 to move perpendicularly to the direction of the diametrically contracting force mentioned above.

Herein, the projections 62, 62 may be projected from the inner peripheral surface 24 of the guide hole 20 inward, instead of being projected from the outer peripheral surface of the outer sleeve 21. Furthermore, it is also possible that the projections 62, 62 are projected from an inner peripheral surface of the outer sleeve 21 inward, projected from an outer peripheral surface of the inner sleeve 31 outward, or projected from the inner peripheral surface of the inner sleeve 31 inward.

Next, explanation for differences between the positioning mechanism 13a of the third socket means 13 and the positioning mechanism 11a of the first socket means 11 will be made as follows with reference to FIG. 7 and FIG. 8.

Figure 7:
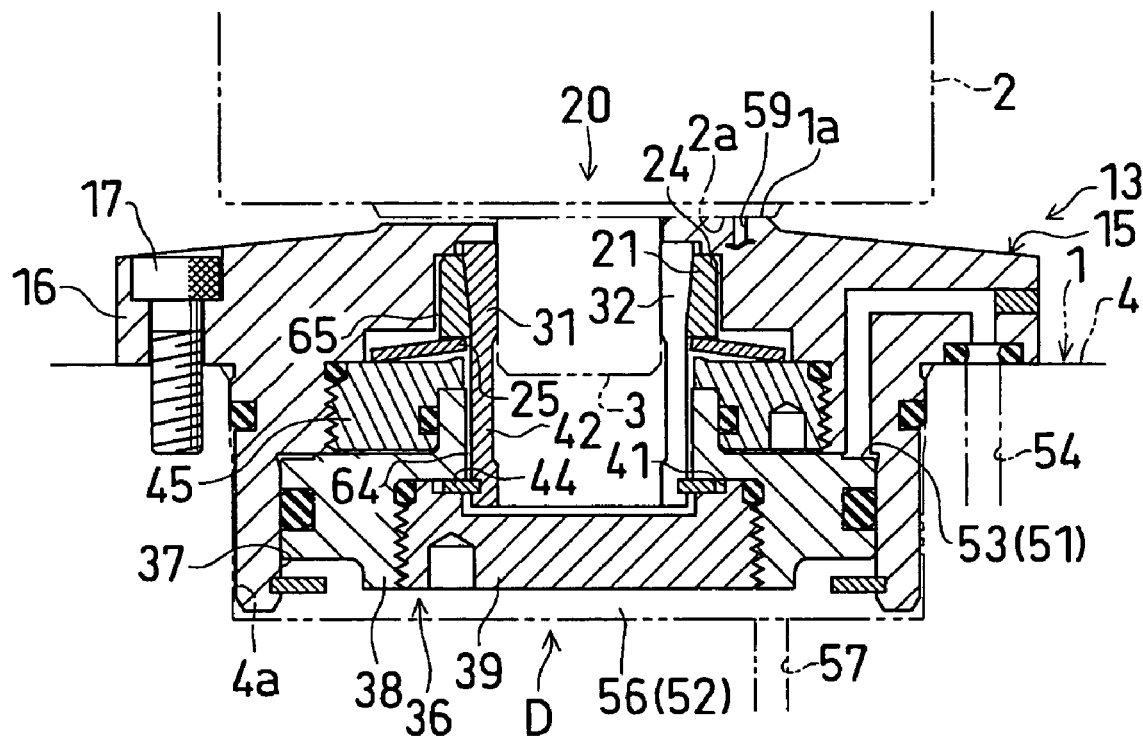

FIG. 7 is a view similar to FIG. 2A, showing a clamping apparatus as the third socket means. FIG. 8 is a view similar to FIG. 3, showing a positioning mechanism of the clamping apparatus of FIG. 7.

Figure 8:
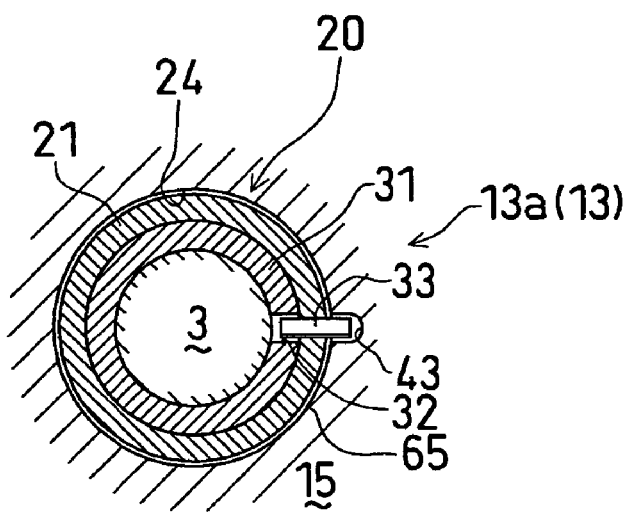

As illustrated in FIG. 8, the peripheral wall of the outer sleeve 21 is circumferentially formed in a seamless manner without any slit. The outer sleeve 21 is fitted inside the inner peripheral surface 24 of the guide hole 20 with a radial gap 65 left therebetween so as to be radially movable. As illustrated in FIG. 7, as well as the second socket means 12 illustrated in FIG. 5 and FIG. 6, the radial gap 64 is formed between the extending portion 42 of the inner sleeve 31 and the inner peripheral surface of the cylindrical hole of the piston 38.

Both this radial gap 64 and the radial gap 65 allow both the inner sleeve 31 and the outer sleeve 21 to move radially with respect to the guide hole 20, by which axial misalignment between the axis of the plug portion 3 and the axis of the guide hole 20 can be absorbed.

It is noted that, in the second socket means 12 and the third socket means 13, for the sake of smooth radial movement of the outer sleeve 21 when absorbing the axial misalignment, it is preferable that a contact gap is provided on an upper side of the outer sleeve 21 in a state that the outer sleeve 21 is raised by the coned disc spring 25.

The first socket means 11, the second socket means 12 and the third socket means 13 operates in substantially the same manner as follows.

In a release state of FIG. 2A, pressurized oil in the lock chamber 53 has been discharged, and pressurized oil has been supplied to the release chamber 56. Thereby, the piston 38 has raised the inner sleeve 31 via the retaining ring 44 and the extending portion 42, and the inner sleeve 31 has been in a diametrically expanded state. The outer sleeve 21 has been raised by an advancing stroke by the coned disc spring 25, and has made a slight tapering engagement with the inner sleeve 31 or has faced the inner sleeve 31 with a small gap left therebetween.

To position the work pallet 2 on the reference block 1, first, the work pallet 2 is lowered in the release state mentioned above, the plug portions 3 are fitted into the inner sleeve 31, resulting in a state of FIG. 1 and FIG. 2A.

Then, the pressurized oil in the release chamber 56 is discharged and pressurized oil is supplied to the lock chamber 53. Then the piston 38 lowers the inner sleeve 31 via the output groove 41, the retaining ring 44 and the extending portion 42, and the tapered outer surface of the inner sleeve 31 makes a wedge engagement with the tapered inner surface of the outer sleeve 21.

Then, the inner sleeve 31 diametrically contracts via the outer sleeve 21 held at substantially a raised position by urging force of the coned disc spring 25, and the inner sleeve 31 comes into contact with the outer peripheral surface of the plug portion 3. Next, the inner sleeve 31 diametrically contracts while compressing the coned disc spring 25 downward via the outer sleeve 21 and comes into close contact with the outer peripheral surface of the plug portion 3. The outer sleeve 21 diametrically expands and comes into close contact with the inner peripheral surface 24 of the guide hole 20. Therefore, the inner sleeve 31 positions the work pallet 2 horizontally via both the outer sleeve 21 and the inner peripheral surfaces 24 of the guide holes 20. Simultaneously, the inner sleeve 31 makes the outer sleeve 21 retreat downward against the urging force of the coned disc spring 25. When the retreating outer sleeve 21 descends by a distance corresponding to the advancing stroke, the coned disc spring 25 comes into contact with the annular projection 85, and the outer sleeve 21 is received by the housing 15 via the coned disc spring 25. Then, the inner sleeve 31 strongly makes a wedge engagement with the received outer sleeve 21 and diametrically contracts, and the inner sleeve 31 comes into strong and close contact with the outer peripheral surface of the plug portion 3 (the state of FIG. 4). Thereby, the output member 36 strongly presses the supported surface 2a of the work pallet 2 toward the support surface 1a of the reference block via the inner sleeve 31 which is in strong and close contact.

It is noted that in a case that the support surface 1a and the supported surface 2a has been in substantially perfect contact with each other and the supported surface 2a has been received by the support surfaces 1a before the locking movement, the inner sleeve 31 operates as follows during the locking movement.

After coming into close contact with the outer peripheral surface of the plug portion 3, the inner sleeve 31 descends while sliding with respect to the plug portion 3. And, as described above, when the outer sleeve 21 compresses the coned disc spring 25 and descends by the advancing stroke, the inner sleeve 31 comes into strong and close contact with the outer peripheral surface of the plug portion 3, and the inner sleeve 31 strongly presses the work pallet 2 toward the reference block 1.

On the other hand, in a case that a gap is left between the support surface 1a and the supported surface 2a for some reason at the start of the locking movement, the inner sleeve 31 operates as described below during the locking movement.

After coming into close contact with the outer peripheral surface of the plug portion 3, the inner sleeve 31 which is in close contact pulls the work pallet 2 downward via the plug portion 3, and brings the supported surface 2a into contact with the support surface 1a. And, as described above, when the outer sleeve 21 compresses the coned disc spring 25 and descends by the advancing stroke, the inner sleeve 31 comes into strong and close contact with the outer peripheral surface of the plug portion 3, and the inner sleeve 31 strongly presses the work pallet 2 toward the reference block 1.

It is noted that, simultaneously with the operation of the first socket means 11 and the second socket means 12, the two third socket means 13, 13 having only the locking function strongly fix the work pallet 2 on the reference block 1 via the inner sleeve 31.

Meanwhile, to switch the state of the clamping apparatus from the locked state (FIG. 4) to the released state (FIG. 2A), as described above, the pressurized oil in the lock chamber 53 is discharged and pressurized oil is supplied to the release chamber 56. Thereby, the piston 38 raises the inner sleeve 31 via the output groove 41, the retaining ring 44 and the extending portion 42, and as a result, the inner sleeve 31 which is in the diametrically contracted state diametrically expands by its own elastic restoring force, so that the locking state is released.

The first embodiment can be changed, for example, as follows.

(1) The inner peripheral surface (surface to be brought into close contact with the outer peripheral surface of the plug portion 3) of the inner sleeve 31 may be formed in a serrated shape or in an uneven shape instead of the vertically straight shape.

(2) Each of the outer sleeve 21 and the inner sleeve 31 that are diametrically expandable and diametrically contractible may be provided with a plurality of through grooves opened alternately on an upper surface and a lower surface of its peripheral wall and the plurality of through grooves are arranged in the circumferential direction instead of being provided with the one slit 22, 32 in its peripheral wall. Each of the outer sleeve 21 and the inner sleeve 31 may also be constituted with a plurality of divided members arranged in the circumferential direction.

(3) The inner surface of the outer sleeve 21 may be formed with a plurality of inclined wedge surfaces arranged circumferentially at predetermined intervals instead of the illustrated tapered surface. In this case, it is also possible that a plurality of inclined grooves are arranged circumferentially at predetermined intervals on the inner surface of the outer sleeve 21 and bottom surfaces of the inclined grooves may form the wedge surfaces. The outer surface of the inner sleeve 31 may also be formed with a plurality of inclined wedge surfaces arranged circumferentially at predetermined intervals instead of the illustrated tapered surface.

(4) The outer sleeve 21 and the inner sleeve 31 may be indirectly engaged with each other via another member instead of directly engaging with each other.

Figure 9:
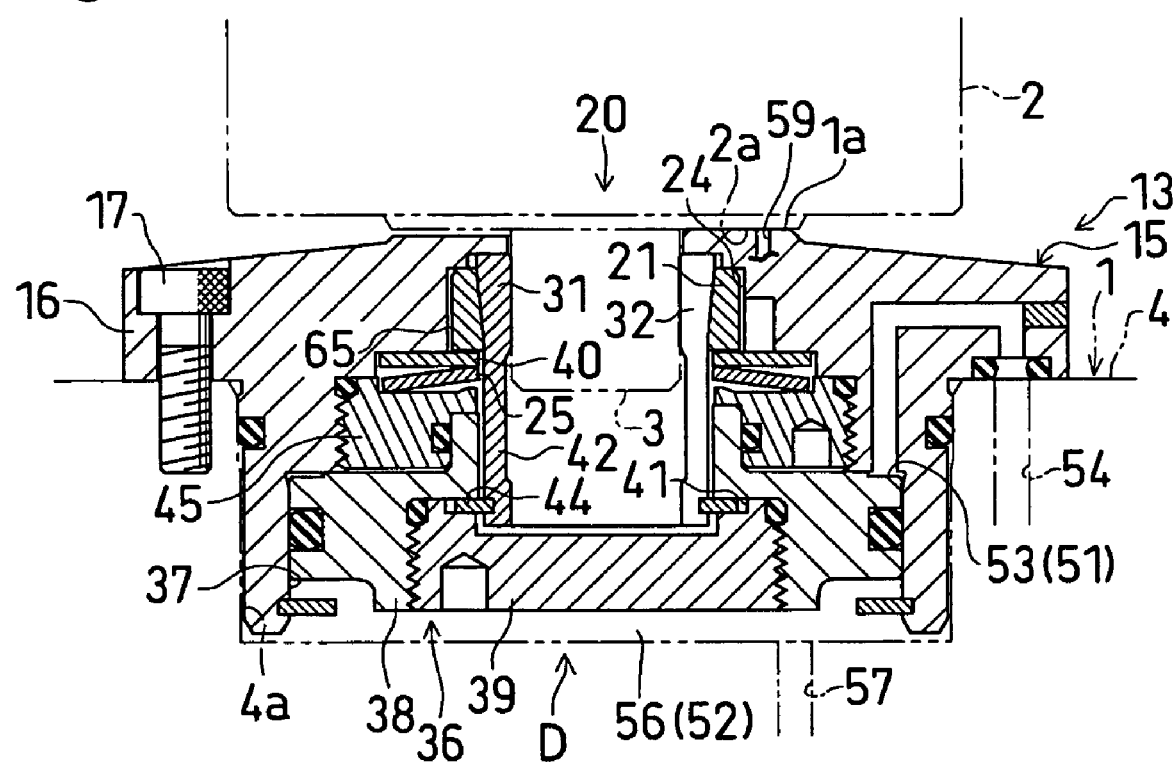
FIG. 9 is a view similar to FIG. 7, showing an exemplified variation of another clamping apparatus.

(5) The structure of the third socket means 13 may employ the structure illustrated in the exemplified variation of FIG. 9 instead of the axial misalignment absorbing structure illustrated in FIG. 7 and FIG. 8.

FIG. 9 is a view similar to FIG. 7. As illustrated in this figure, a ring-shaped plate 40 is arranged between the coned disc spring 25 and the outer sleeve 21. With this structure, at the beginning of the locking movement, the plate 40 is in contact with and received by a wall of the housing 15, and the urging force of the coned disc spring 25 against the outer sleeve 21 is not applied at all. In the middle of the locking movement, when the plate 40 is lowered by the outer sleeve 21, the spring force of the coned disc spring 25 starts to be applied to the outer sleeve 21.

With the above mentioned structure, a radial frictional force acting on the outer sleeve 21 is reduced, thereby, it is possible to move both the inner sleeve 31 and the outer sleeve 21 radially smoothly during the absorbing operation for the axial misalignment between the axis of the plug portion 3 and the axis of the guide hole 20. It is a matter of course that the structure of FIG. 9 using the plate 40 can also be applied to the second socket means 12 in completely the same manner.

Next, explanation for a plurality of embodiments and exemplified variations of the present invention will be made with reference to FIG. 10A through FIG. 29. In these other embodiments, components similar to those of the abovementioned first embodiment will be designated and described by the same numerals as a general rule.

Second Embodiment

Figure 10B:
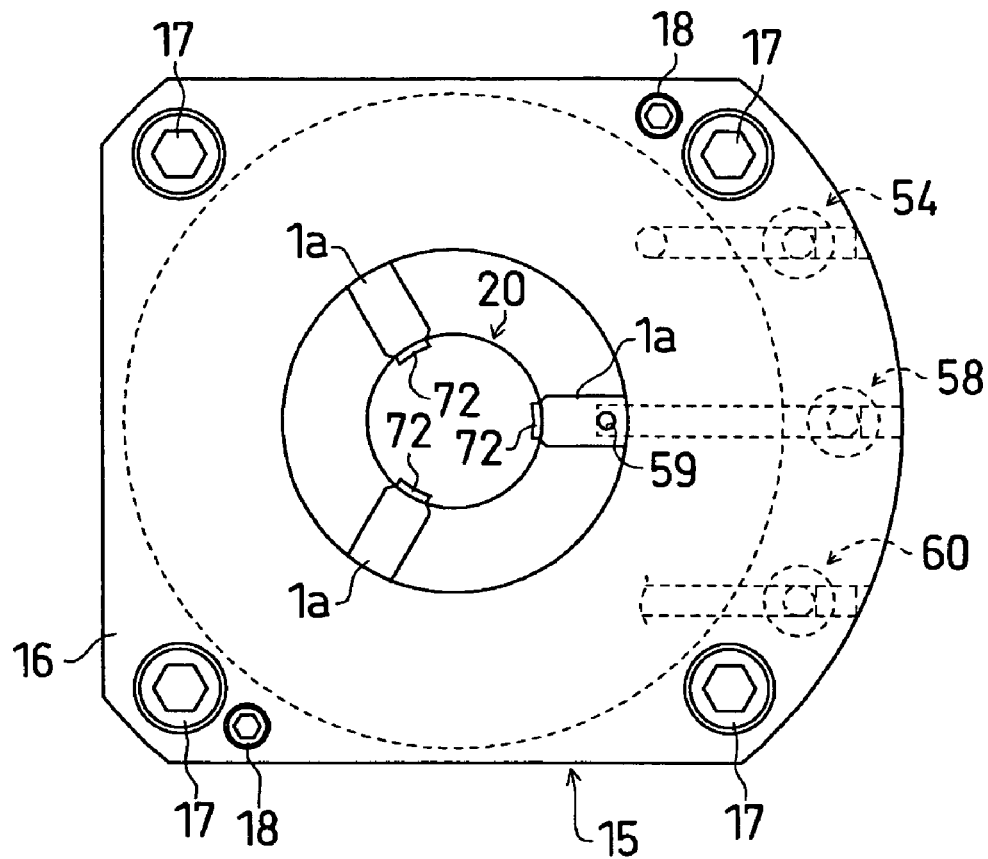
FIG. 10A, FIG. 10B and FIG. 11 show a clamping apparatus of a second embodiment of the present invention.
Figure 10A:
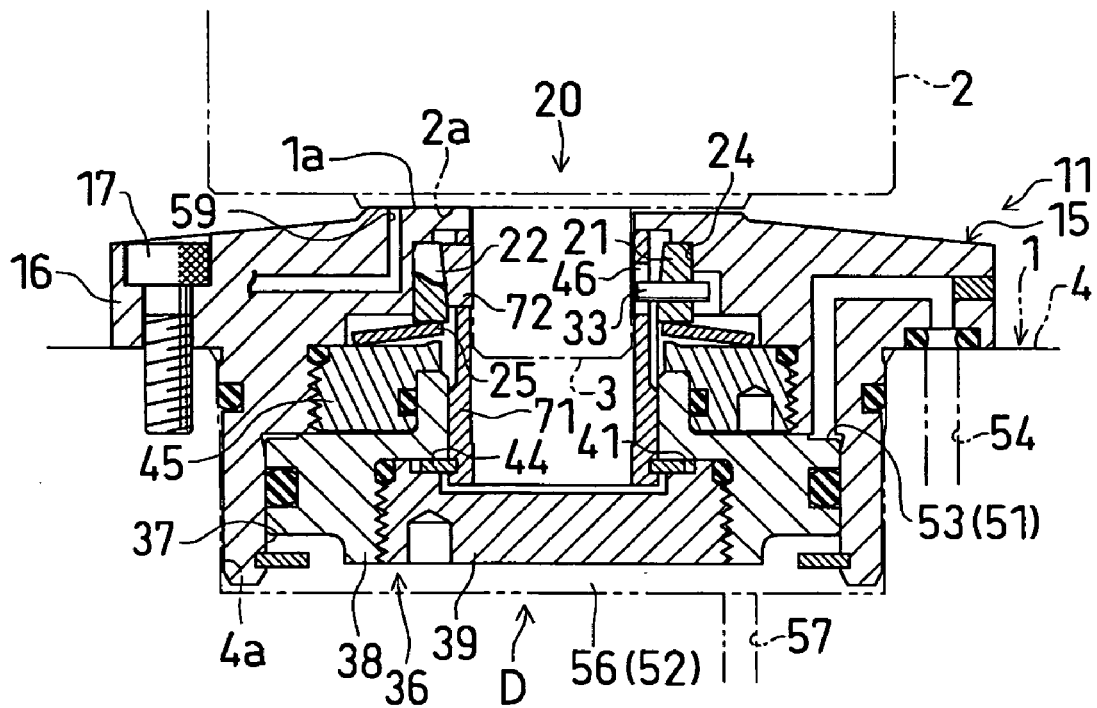
Figure 11:
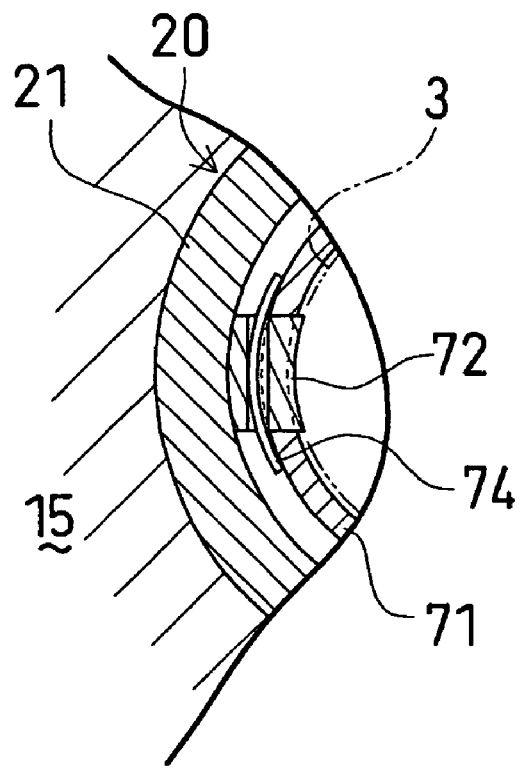

FIG. 10A, FIG. 10B and FIG. 11 show a first socket means 11 of a second embodiment of the present invention. FIG. 10A is a view similar to FIG. 2A. FIG. 10B is a plan view of the first socket means 11, and this view is similar to FIG. 2B. FIG. 11 is an enlarged view of a cross sectional view of a main part of FIG. 10A.

The first socket means 11 of the second embodiment is different from the first embodiment in the following points.

Namely, in place of the inner sleeve 31 which is diametrically expandable and diametrically contractible as described in the first embodiment (FIG. 2A), as illustrated in FIG. 10A, an annular socket 71 into which the plug portion 3 is allowed to be inserted is arranged in an inner periphery of the outer sleeve 21. A peripheral wall of the annular socket 71 is circumferentially formed in a seamless manner without any slit. On the annular socket 71 are supported three pressing members (inner engaging members) 72 circumferentially at intervals radially movably. Outer surfaces of the pressing members 72 are wedge-engaged with the inner surface of the outer sleeve 21 from above.

Each of the pressing members 72 is adapted to move radially outward by a return means 74 (see FIG. 11). As illustrated in FIG. 10A, a retaining ring 44 is fitted to a lower end portion of the annular socket 71, and this retaining ring 44 is connected to the output groove 41 of the output member 36. It is noted that in the annular socket 71 is opened a stop hole 46, and by inserting the stopper pin 33 fixed to the outer sleeve 21 into this stop hole 46, rotation of the annular socket 71 is blocked.

FIG. 11 shows details of the return means 74, and the return means 74 is formed with a rod-shaped spring attached between the annular socket 71 and a through hole of the pressing member 72. The spring-type return means 74 urges the pressing member 72 outward (toward the inner peripheral surface of the outer sleeve 21).

Figure 12:
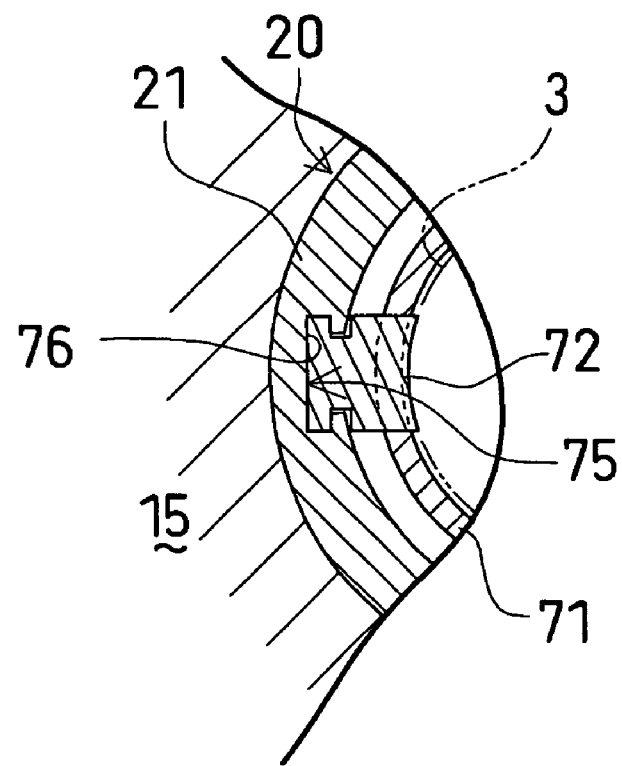
FIG. 12 is a view similar to FIG. 11, showing an exemplified variation of the return means.

The return means 74 may also be constituted as an exemplified variation of FIG. 12. FIG. 12 is a view similar to FIG. 11.

In the exemplified variation shown in FIG. 12, a plurality of inclined grooves 75 are formed on the inner peripheral surface of the outer sleeve 21 circumferentially at intervals, and the inclined groove 75 is formed in a T shape in a plan view, and the return means is formed with a fitting structure composed of side walls of the inclined groove 75 and an outer end portion of the pressing member 72. A wedge surface 76 is formed on a bottom surface of the inclined groove 75. It is noted that the inclined groove 75 may also be formed in a V shape instead of the T shape in a plan view.

The operation of the second embodiment is different from that of the first embodiment in that, during the locking operation, each of the pressing members 72 supported on the annular socket 71 projects radially inward and an inner surface of each of the pressing members 72 comes into strong and close contact with the outer peripheral surface of the plug portion 3.

The second embodiment can be changed for example as follows.

(1) The pressing members 72 may be indirectly engaged with the inner surface of the outer sleeve 21 via other members instead of directly engaging with the inner surface. The pressing members 72 may be provided in two, four or more instead of three as illustrated.

(2) The inner surface of the pressing member 72 may be formed in a serrated shape or in an uneven shape instead of the vertically straight shape.

(3) It is desirable that discharge ports for cleaning fluid are formed by fitting gaps between the annular socket 71 and the pressing members 72, and are communicatively connected to the blow port 60 formed in the reference block 1. In this case, the fitting gaps can be automatically cleaned, so that the pressing members can smoothly move with high degree of accuracy.

(4) The advancing means may be a plurality of coned disc springs vertically laminated, compression coil spring or rubber instead of the illustrated one coned disc spring 25.

Figure 13:
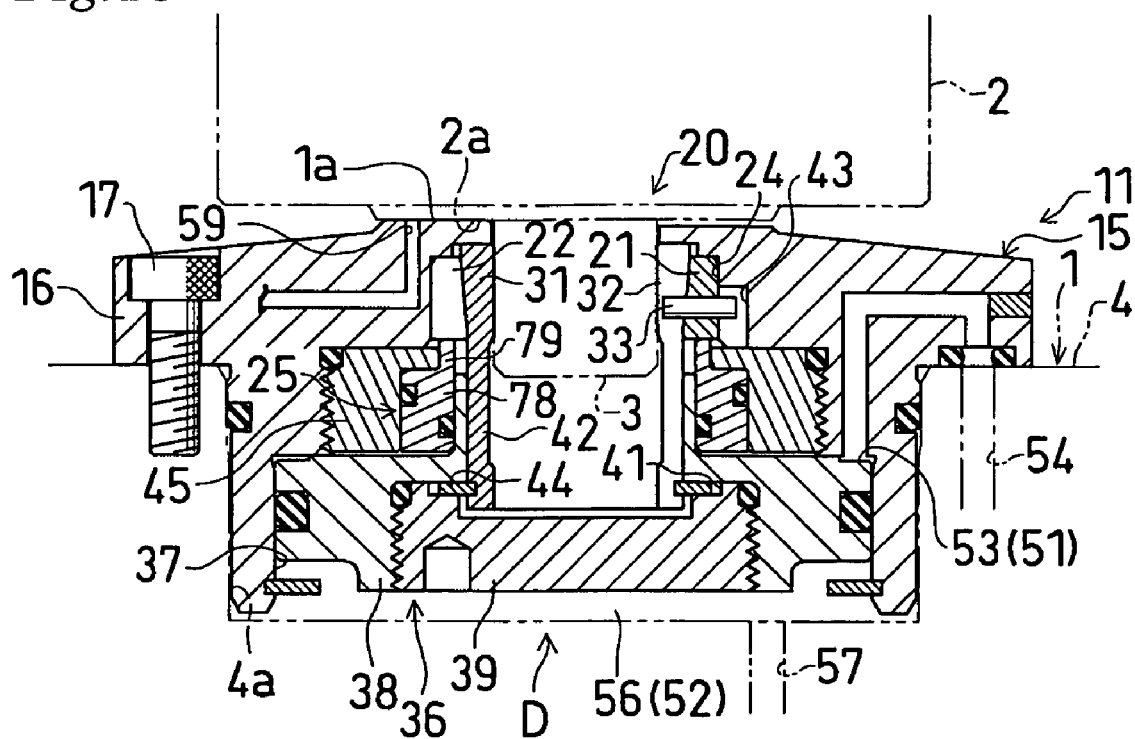
FIG. 13 is a view similar to FIG. 10, showing an exemplified variation of an advancing means provided in all kinds of the clamping apparatuses.

(5) The advancing means is only required to have a function to press the outer sleeve 21 with predetermined force, and instead of (or in addition to) using the elastic member such as the coned disc spring 25, for example, as illustrated in the exemplified variation of FIG. 13, a cylinder structure using pressurized fluid such as pressurized oil or compressed air may be employed.

FIG. 13 is a view similar to FIG. 10. In this exemplified variation, onto an outer periphery of a cylindrical portion of the output member 36 is hermetically fitted an annular advancing piston 78 as the advancing means 25. The pressure receiving area of this advancing piston 78 is set smaller than that of the piston 38.

An annular pressing portion 79 is integrally formed in a projecting manner from an upper surface of the advancing piston 78. The pressure of the pressurized oil supplied to the lock chamber 53 is adapted to press the outer sleeve 21 upward via the advancing piston 78 and the annular pressing portion 79.

Instead of forming the annular pressing portion 79 integrally with the advancing piston 78, it is also possible that another member such as a pin is arranged between the advancing piston 78 and the outer sleeve 21, and the advancing piston 78 indirectly presses the outer sleeve 21 via the pin or the like.

Third Embodiment

Figure 14:
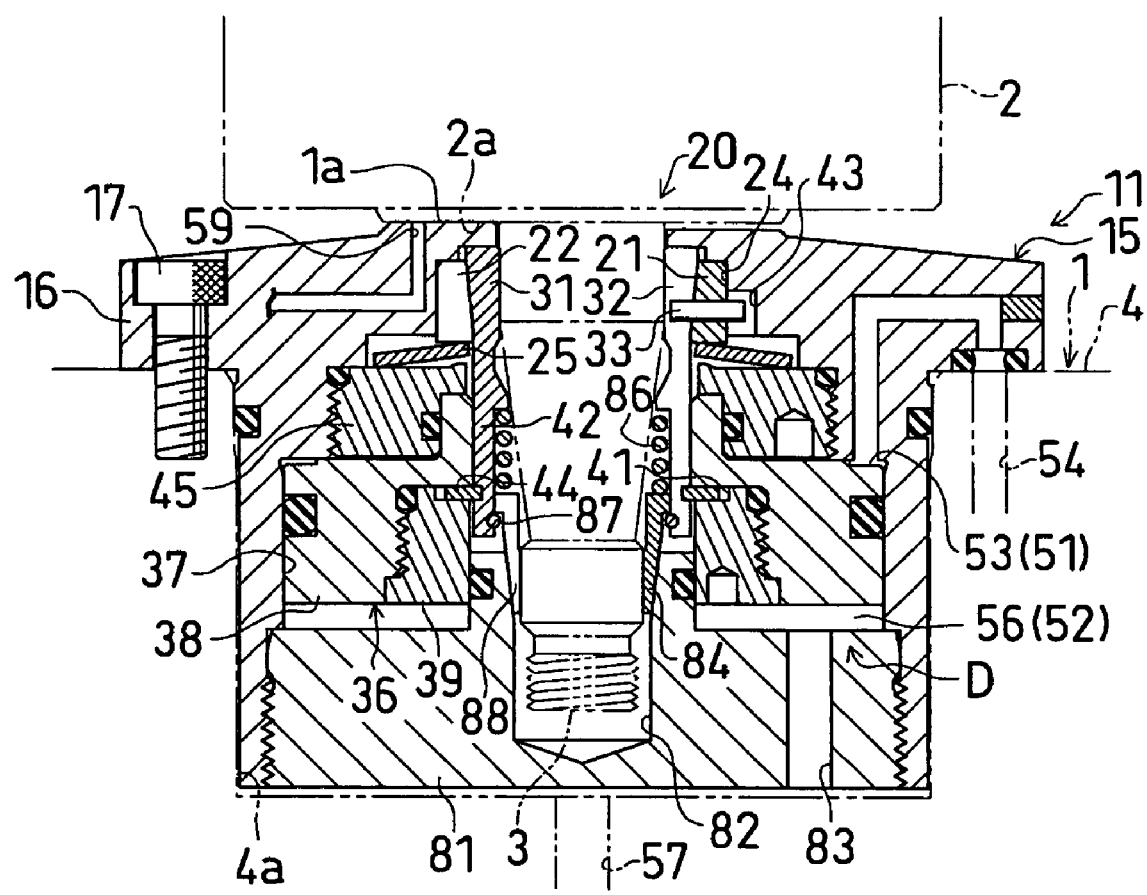
FIG. 14 is a view similar to FIG. 2A, showing a clamping apparatus of a third embodiment of the present invention.

FIG. 14 is a view similar to FIG. 2A, showing a first socket means 11 of a third embodiment of the present invention.

In this third embodiment, the plug portion 3 formed in a long shape is positioned at two points on a leading end side of the plug portion and a base end side of the plug portion.

Hereinafter, concrete explanation for the third embodiment will be made. Namely, as illustrated in FIG. 14, at a lower position of the output member 36, a closing cover 81 is screwed into the cylindrical hole 37. In an upper surface of the closing cover 81 is opened an axial hole 82 into which a leading end portion of the long-shaped plug portion 3 is allowed to be inserted. Between the closing cover 81 and the output member 36 is formed the release chamber 56. The release chamber 56 is communicatively connected to the pressurized oil supply/discharge port 57 via a communication hole 83 which vertically penetrates the closing cover 81.

Inside the extending portion 42 of the inner sleeve 31 is fitted a second sleeve 84. The second sleeve 84 is formed in a collet shape, and in its peripheral wall is formed one slit 88 extending vertically. As a result, the second sleeve 84 is adapted to be diametrically expandable and diametrically contractible.

The second sleeve 84 is provided so as to project downward from the extending portion 42, and an inner peripheral surface of the projecting portion is adapted to come into close contact with an outer peripheral surface of a leading end side of the plug portion 3, meanwhile, a tapered outer surface is formed on an outer peripheral surface of the projecting portion. On the other hand, on an inner peripheral surface of the axial hole 82 of the closing cover 81 is formed a tapered inner surface, and the tapered outer surface of the second sleeve 84 is adapted to wedge-engage with this inner surface from above.

The second sleeve 84 is usually urged downward by a coil spring-shaped urging spring 86 arranged inside the extending portion 42. However, the second sleeve 84 is prevented from moving downward by more than a predetermined distance by means of a second retaining ring 87 fitted inside the extending portion 42.

With this structure, when the pressurized oil in the release chamber 56 is discharged and pressurized oil is supplied to the lock chamber 53, a base end side of the plug portion 3 is positioned horizontally by the inner sleeve 31 in completely the same manner as the first embodiment. Simultaneously, the inner peripheral surface of the second sleeve 84 comes into close contact with the outer peripheral surface of the leading end side of the plug portion 3 pulled downward by the inner sleeve 31 which is in close contact with the plug portion 3, and the second sleeve 84 is pulled downward due to friction between the second sleeve 84 and the plug portion 3. Simultaneously, due to aligning action based on wedge-engagement between the tapered outer surface of the second sleeve 84 and the tapered inner surface of the axial hole 82, the leading end side of the plug portion 3 is positioned horizontally. As described above, the long-shaped plug portion 3 is adapted to be positioned at the two ends, which are the leading end and the base end thereof.

Fourth Embodiment

Figure 15B:
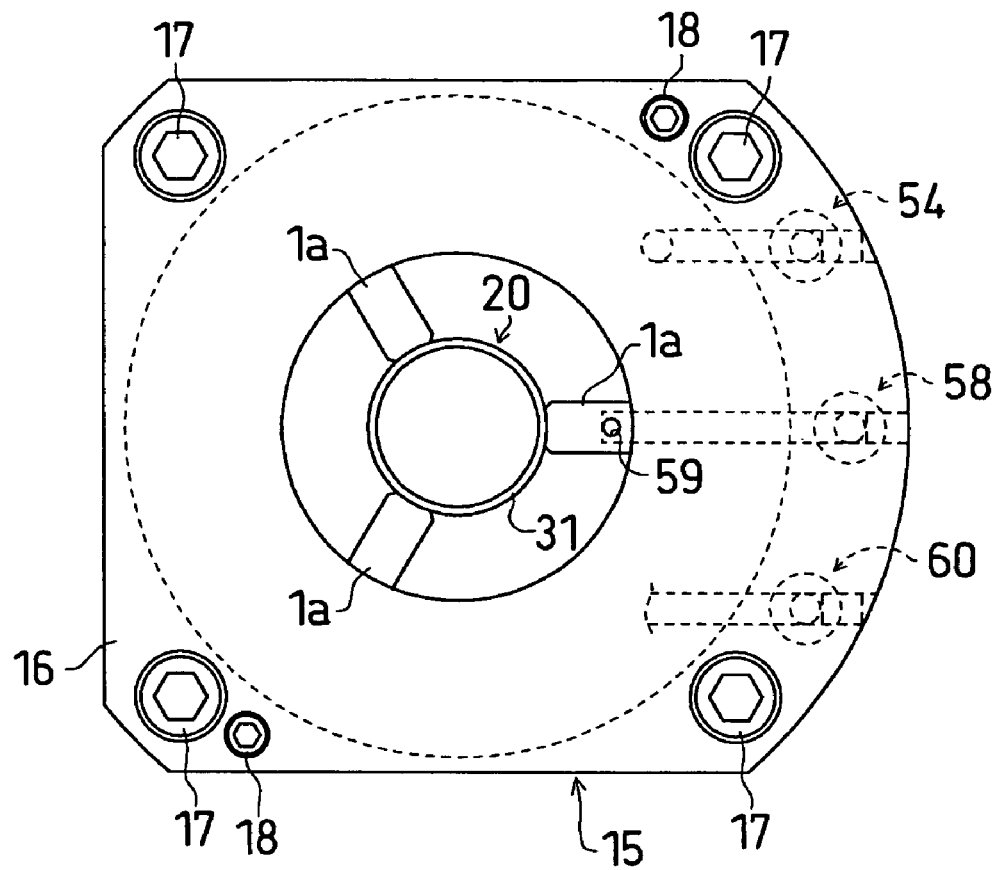
FIG. 15A, FIG. 15B and FIG. 16 show a clamping apparatus of a fourth embodiment of the present invention.
Figure 15A:
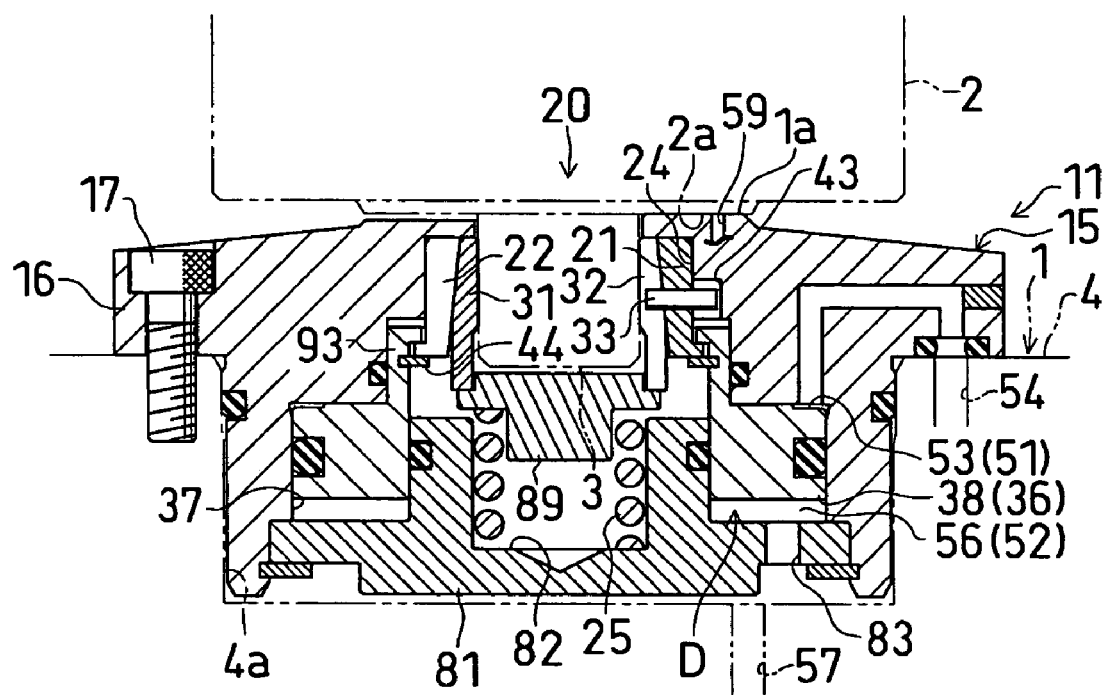
Figure 16:
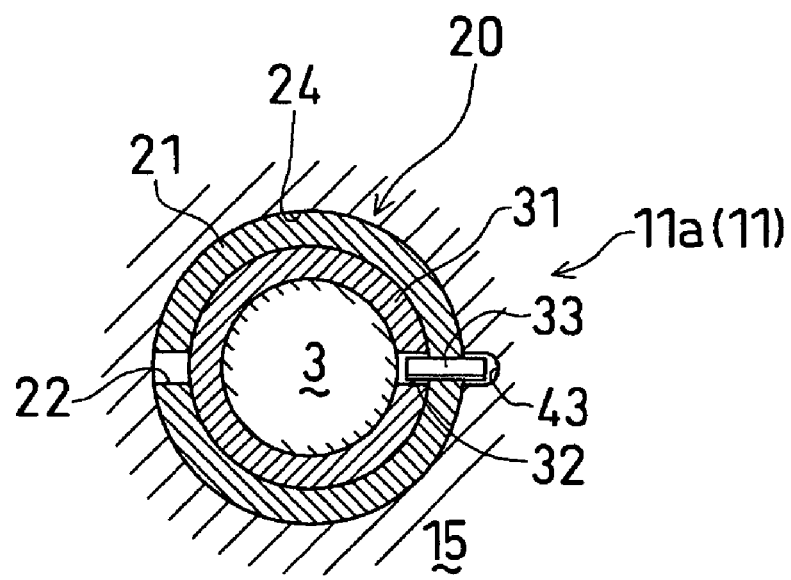

FIG. 15A, FIG. 15B and FIG. 16 show a first socket means 11 of the fourth embodiment of the present invention. FIG. 15A is a view similar to FIG. 2A. FIG. 15B is a plan view of the first socket means 11, this view is similar to FIG. 2B. FIG. 16 is an enlarged view of a cross sectional view of a main part of FIG. 15A.

In this fourth embodiment, as illustrated in FIG. 15A, on the inner peripheral surface 24 of the guide hole 20 of the housing 15 is supported the outer sleeve 21, and the inner sleeve 31 is wedge-engaged with an inner side of the outer sleeve 21 from below. Namely, both the tapered inner surface of the outer sleeve 21 and the tapered outer surface of the inner sleeve 31 are formed so as to gradually narrow upward.

At a lower position of the output member 36, a closing cover 81 is fitted to the cylindrical hole 37. In this closing cover 81 is formed an axial hole 82 in which an urging spring 25 described later can be accommodated. Between the closing cover 81 and the output member 36 is formed the release chamber 56. This release chamber 56 is communicatively connected to the pressurized oil supply/discharge port 57 via a communication hole 83 penetrating the closing cover 81 vertically.

Below the inner sleeve 31 is arranged a spring support member 89, and between this spring support member 89 and a bottom surface of the axial hole 82 is elastically provided a coil spring-shaped urging spring 25. As a result, the inner sleeve 31 is urged upward.

From an upper surface of the piston 38 as the output member 36 is integrally projected an annular extending cylindrical portion 93. On an inner peripheral surface of a leading end of the extending cylindrical portion 93 is formed a narrow portion, and to the narrow portion is connected a lower end of the outer sleeve 21 via a retaining ring 44.

Figure 17:
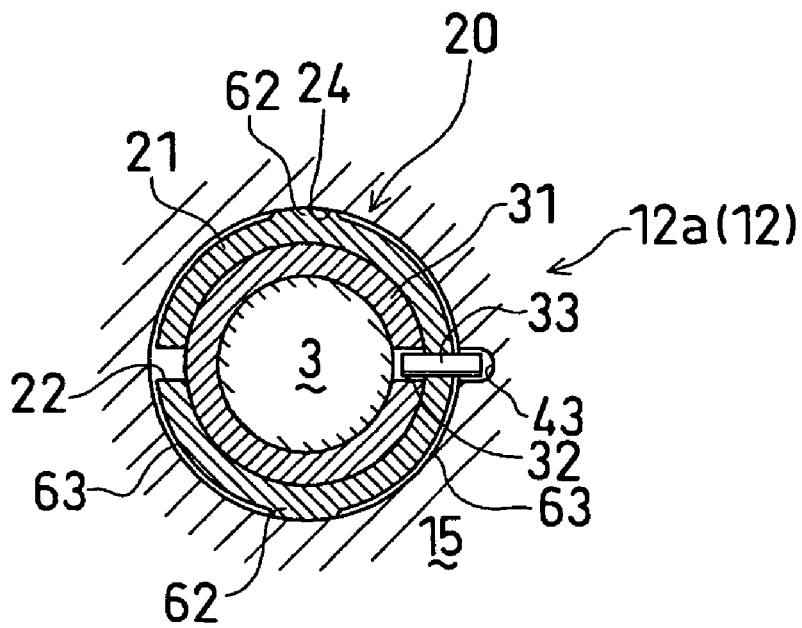
FIG. 17 is a view similar to FIG. 6, showing another positioning mechanism provided in the clamping apparatus.

It is noted that FIG. 17 is a view similar to FIG. 6, showing a positioning mechanism 12a of a second socket means 12 of the fourth embodiment.

As illustrated in this FIG. 17, in the second socket means, as well as the second socket means of the first embodiment, a pair of projections 62, 62 radially facing each other are provided on the outer peripheral surface of the outer sleeve 21, and at portions other than the portions where these projections 62, 62 are shaped are formed escape grooves 63, 63. Thereby, the projections 62, 62 generate diametrically contracting force at two points facing each other on the inner peripheral wall of the inner sleeve 31.

Figure 18:
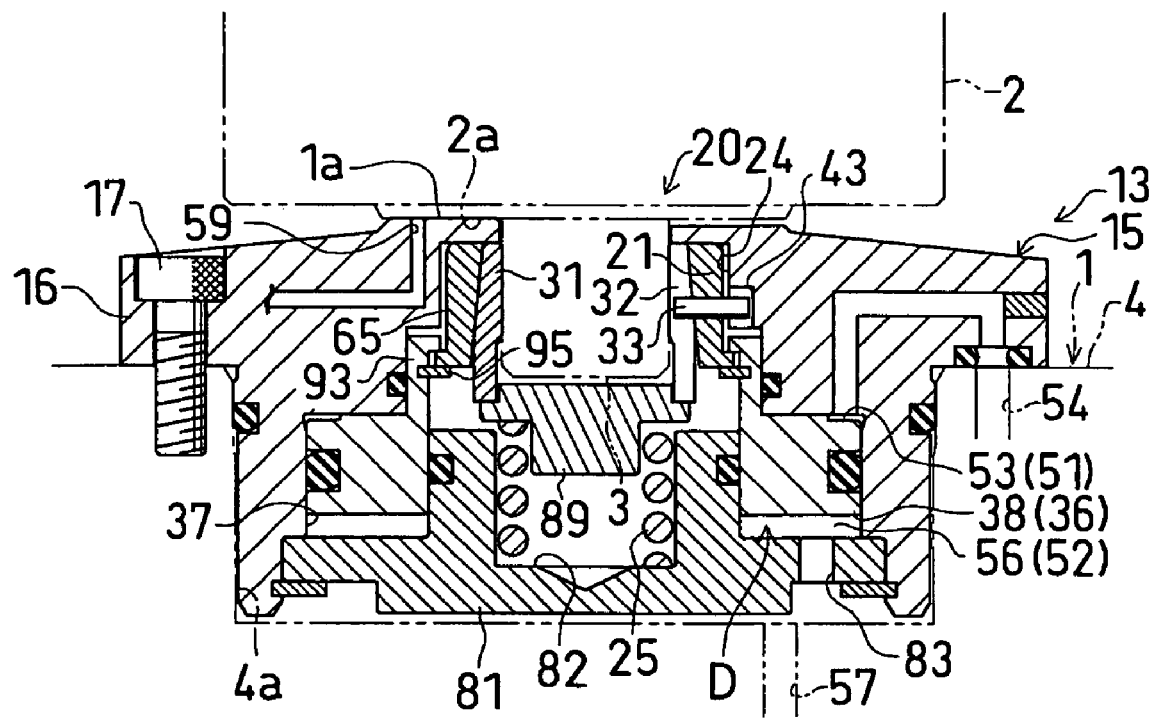
FIG. 18 is a view similar to FIG. 7, showing another clamping apparatus of the fourth embodiment.
Figure 19:
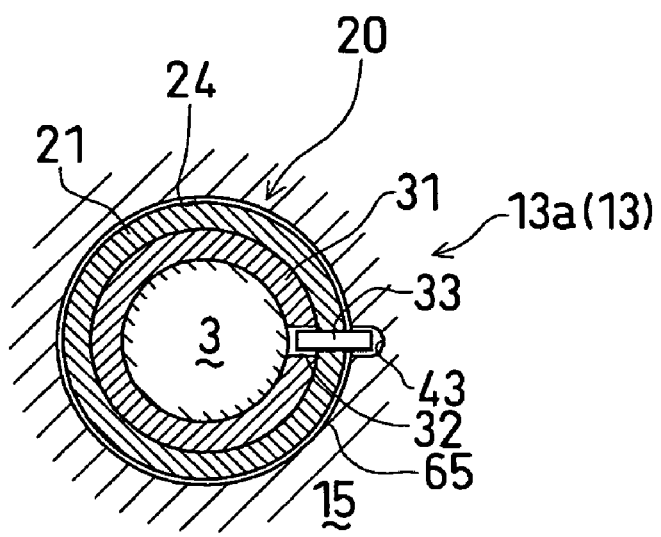
FIG. 19 is a view similar to FIG. 8, showing a positioning mechanism provided in the clamping apparatus.

FIG. 18 and FIG. 19 show a third socket means 13 in the fourth embodiment. FIG. 18 is a view similar to FIG. 15A. FIG. 19 is a view similar to FIG. 16.

In the third socket means 13, as well as the third socket means of the first embodiment, the peripheral wall of the outer sleeve 21 is circumferentially formed in a seamless manner without any slit (FIG. 19). This outer sleeve 21 is inserted inside the inner peripheral surface 24 of the guide hole 20 radially movably with a radial gap 65 left. This radial gap 65 allows both the inner sleeve 31 and the outer sleeve 21 to move radially with respect to the guide hole 20, so that axial misalignment between the axis of the plug portion 3 and the axis of the guide hole 20 can be absorbed.

Fifth Embodiment

Figure 20B:
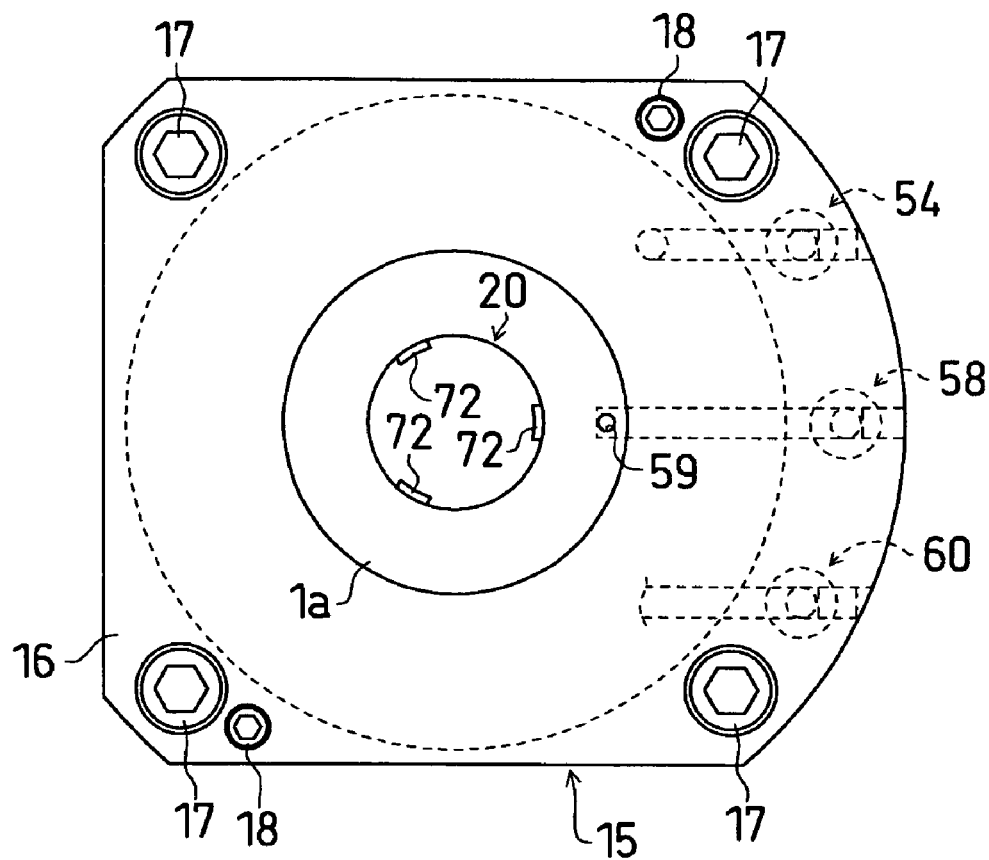
FIG. 20A and FIG. 20B show a clamping apparatus of a fifth embodiment of the present invention.
Figure 20A:
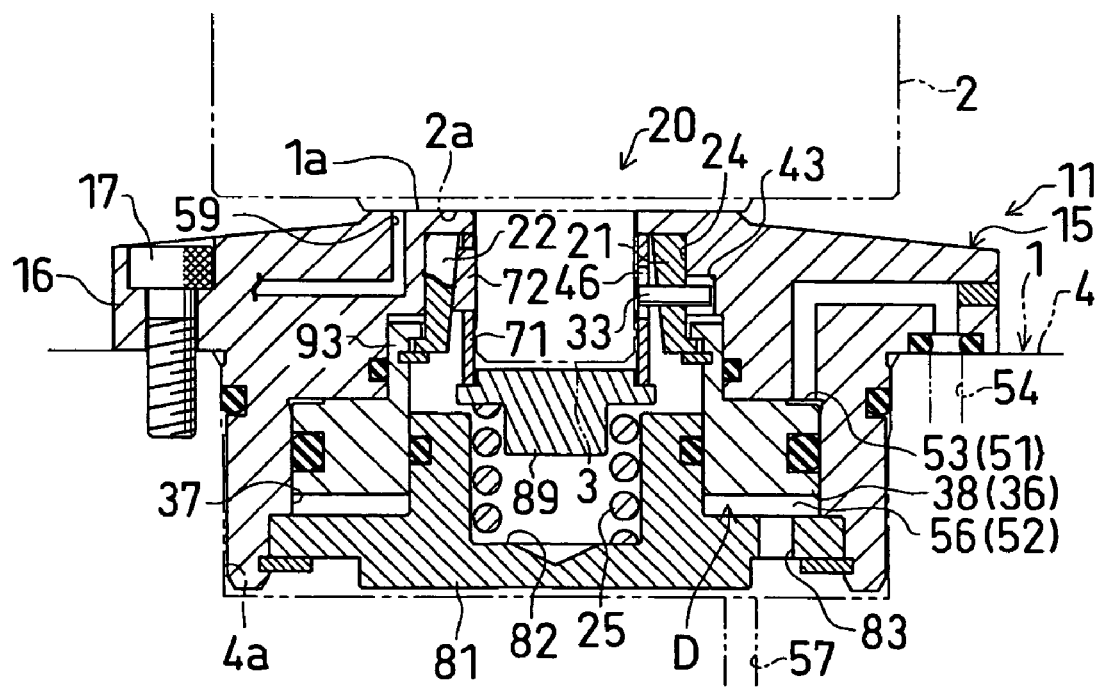

FIG. 20A and FIG. 20B show a first socket means 11 of a fifth embodiment. FIG. 20A is a view similar to FIG. 10A, and FIG. 20B is a view similar to FIG. 10B.

In this fifth embodiment, a spring support member 89 is arranged below the annular socket 71 in the same manner as the fourth embodiment, and this spring support member 89 is urged upward by the urging spring 25.

On the annular socket 71 are supported a plurality of pressing members 72, and the pressing members 72 are wedge-engaged with the outer sleeve 21 from below. Namely, the tapered inner surface of the outer sleeve 21 and tapered outer surfaces formed on the pressing members 72 are formed so as to gradually narrow upward.

It is noted that, in this fifth embodiment, as illustrated in FIG. 20B, the number of the support surfaces 1a provided on the flange 16 of the housing 15 is not plural, but only one support surface 1a is provided annularly so as to surround the guide hole 20.

Sixth Embodiment

Figure 21B:
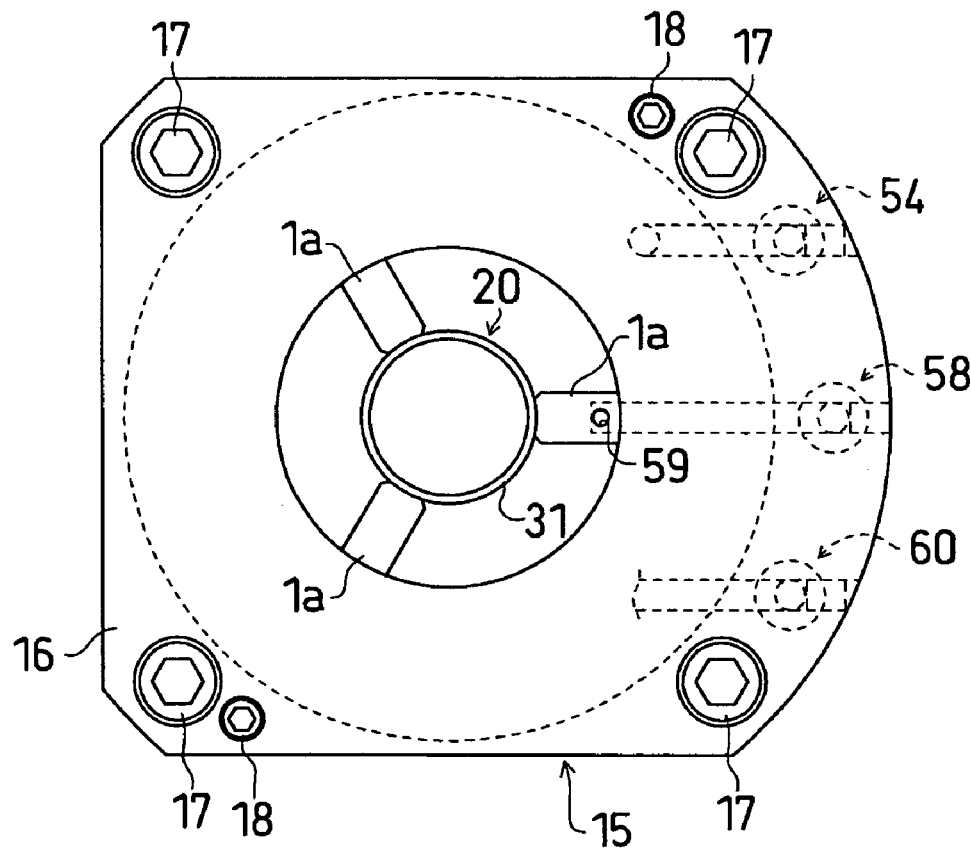
FIG. 21B is a view similar to FIG. 2B.
Figure 21A:
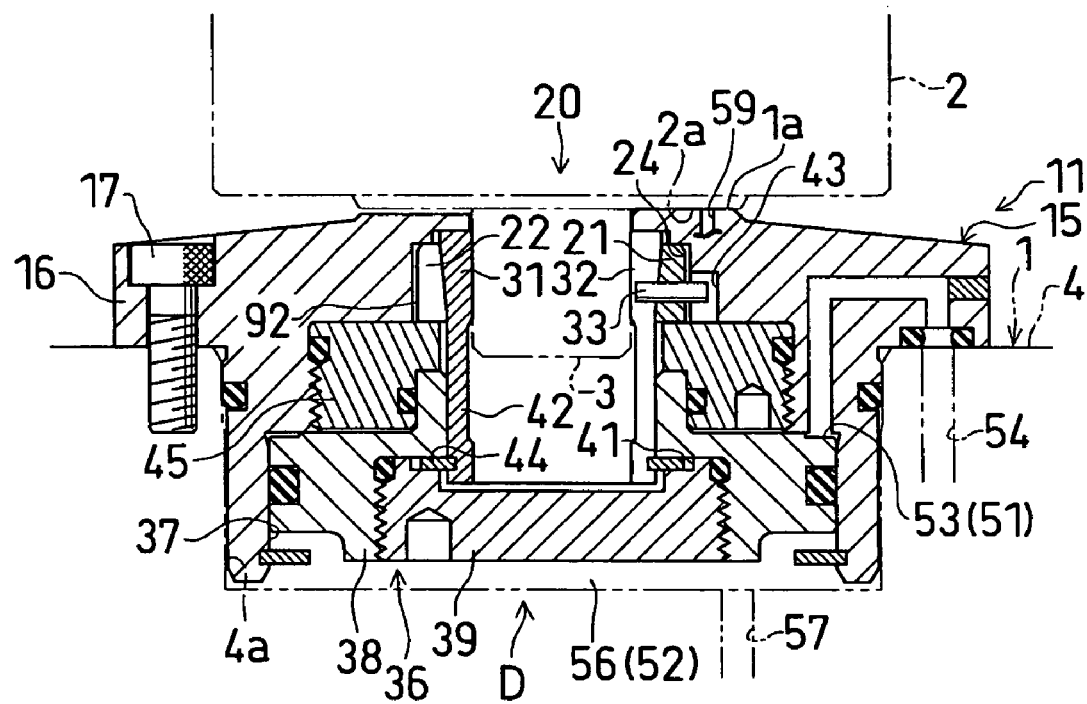
Figure 22:
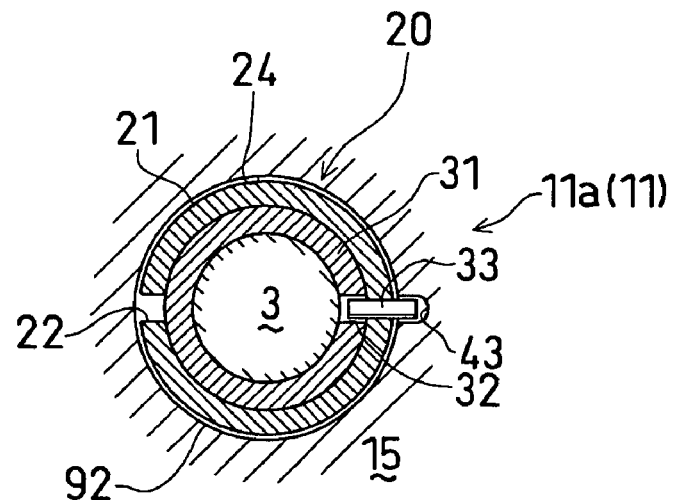
Figure 23:
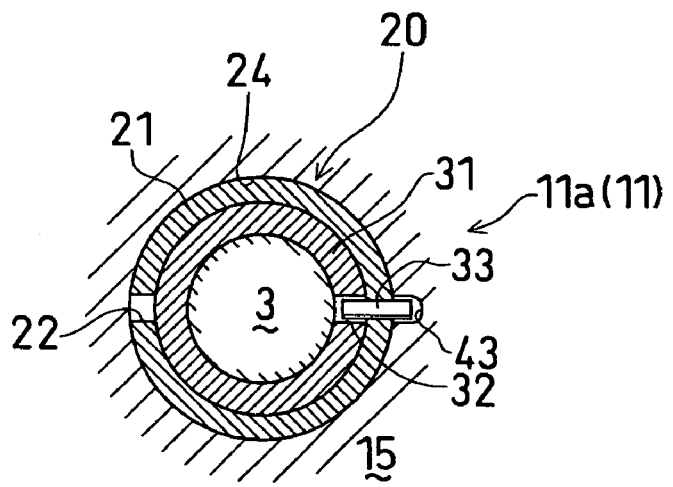

FIG. 21A through FIG. 23 show a first socket means 11 of a sixth embodiment. FIG. 21A is a view similar to FIG. 2A. FIG. 21B is a view similar to FIG. 2B. FIG. 22 is a view similar to FIG. 3, showing a release state of a positioning mechanism 11a. FIG. 23 is a view similar to FIG. 22, showing a locked state of the positioning mechanism 11a.

In this sixth embodiment, as illustrated in FIG. 21A, the slit 22 is formed in a peripheral wall of the outer sleeve 21 so that the outer sleeve 21 is allowed to deform elastically so as to diametrically expand and diametrically contract. As illustrated in FIG. 21A and FIG. 22, between the outer peripheral surface of the outer sleeve 21 and the inner peripheral surface 24 of the guide hole 20 is formed a comparatively large annular gap 92 in a state that the outer sleeve 21 does not elastically deform.

With this structure, as illustrated in FIG. 22, the outer sleeve 21 does not elastically deform in the released state, and as a result, the annular gap 92 exists. During the locking movement, the inner sleeve 31 pulled downward by the output member 36 diametrically expands the outer sleeve 21 as illustrated in FIG. 23, and the inner sleeve 31 descends while diametrically contracting.

It is noted that the elastic resistance force when the outer sleeve 21 is diametrically expanded corresponds to the urging force of the coned disc spring (advancing means). Therefore, in this sixth embodiment, the advancing means such as the coned disc spring is omitted. When the outer sleeve 21 elastically deforms in the diametrically expanding direction and the annular gap 92 completely disappears, the outer sleeve 21 is received by the housing 15 (in detail, by the inner peripheral surface 24 of the guide hole 20), and the inner sleeve 31 comes into strong and close contact with the outer peripheral surface of the plug portion 3 while diametrically contracting.

Figure 24:
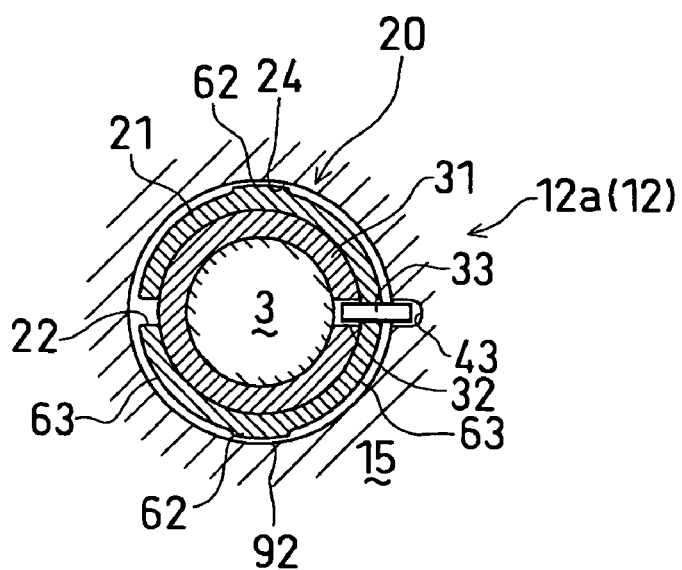
FIG. 24 is a view similar to FIG. 6, showing another positioning mechanism provided in the clamping apparatus in a released state.
Figure 25:
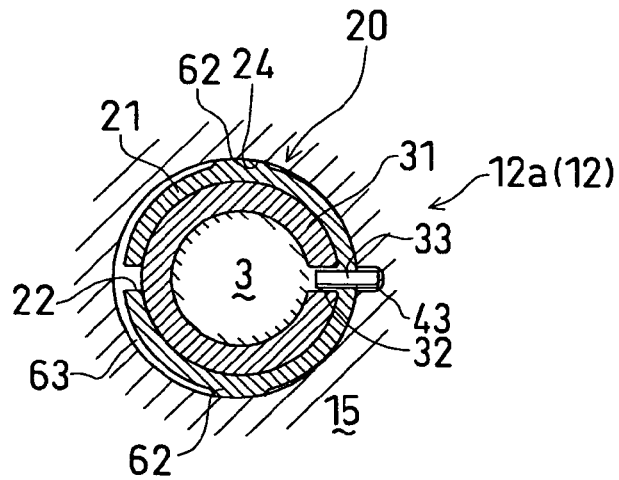
FIG. 25 is a view similar to FIG. 24, showing the positioning mechanism in a locked state.

FIG. 24 and FIG. 25 show a positioning mechanism 12a of a second socket means 12 of the sixth embodiment. FIG. 24 is a view similar to FIG. 6, showing a released state. FIG. 25 is a view similar to FIG. 24, showing a locked state.

The positioning mechanism 12a of the second socket means 12 is different from the positioning mechanism 11a of the first socket means 11 in that the projections 62, 62 and escape grooves 63, 63 are provided on the outer peripheral surface of the outer sleeve 21. In the released state, as illustrated in FIG. 24, between the outer surfaces of the projections 62, 62 and the inner peripheral surface 24 of the guide hole 20 is formed gaps 92. By forming the escape grooves 63, 63, as illustrated in FIG. 25, movements of the inner sleeve 31 in a direction perpendicular to a direction in which the diametrically contracting force of the inner sleeve 31 generates (namely, movements of the plug portion 3) are allowed.

Figure 26:
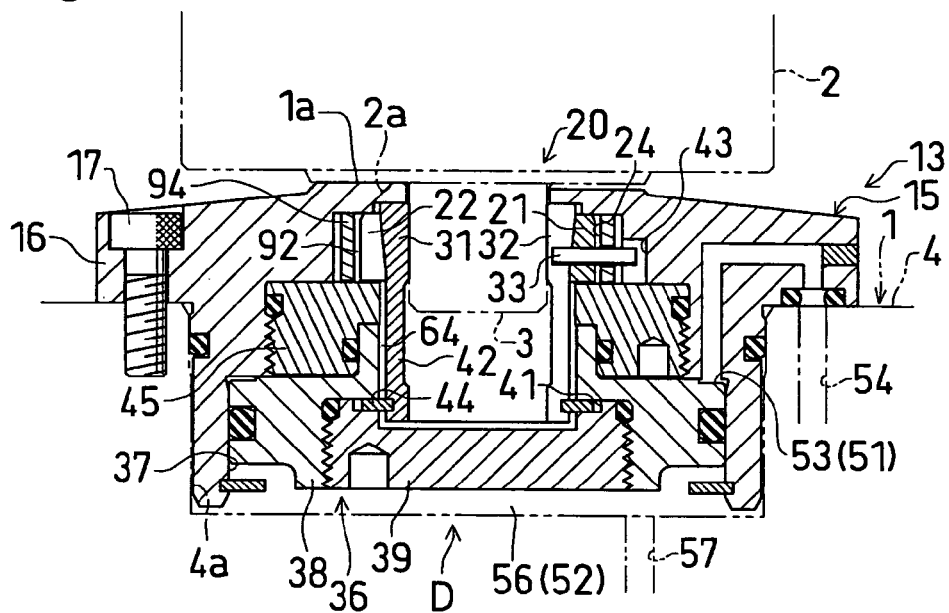
FIG. 26 is a view similar to FIG. 7, showing another clamping apparatus of the sixth embodiment.
Figure 27:
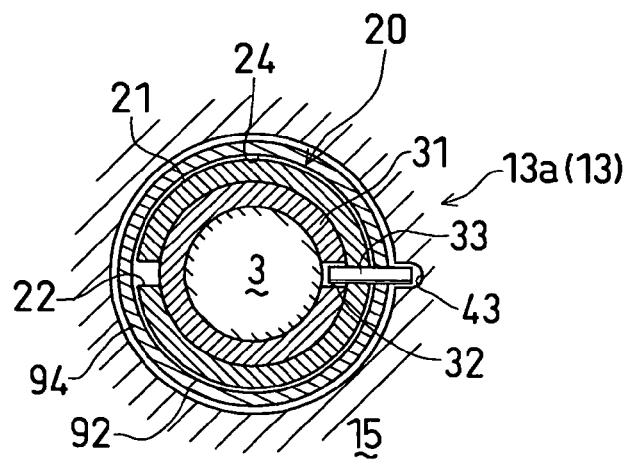
FIG. 27 is a view similar to FIG. 8, showing a positioning mechanism of the clamping apparatus.

FIG. 26 and FIG. 27 show a third socket means 13 of the sixth embodiment. FIG. 26 is a view similar to FIG. 7. FIG. 27 is a view similar to FIG. 8.

In this third socket means 13, outside the outer sleeve 21 is arranged an intermediate sleeve 94. Between this intermediate sleeve 94 and an inner peripheral surface of a hole of the housing 15 for accommodating the intermediate sleeve 94 is formed an appropriate gap. Due to this gap, the intermediate sleeve 94 is allowed to move radially. Between the outer sleeve 21 and the intermediate sleeve 94 is formed the annular gap 92. The inner sleeve 31 is wedge-engaged with the outer sleeve 21 from above.

In the third socket means 13 of this sixth embodiment, the inner peripheral surface of the intermediate sleeve 94 serves as the inner peripheral surface 24 of the guide hole 20. Therefore, according to radial movements of the intermediate sleeve 94, the inner peripheral surface 24 of the guide hole 20 is allowed to move radially. As a result, radial misalignment between the axis of the plug portion 3 and the axis of the guide hole 20 can be absorbed by radial movements of the intermediate sleeve 94.

It is noted that the structure including this intermediate sleeve 94 can be used for the aforementioned various third socket means. For example, in the third socket means shown in the first embodiment (FIG. 7 and FIG. 8) and the fourth embodiment (FIG. 18 and FIG. 19), it is possible that the radial gap 65 is omitted, and instead of the radial gap 65, an intermediate sleeve 94 formed in the same manner is fitted outside the outer sleeve 21.

Figure 28:
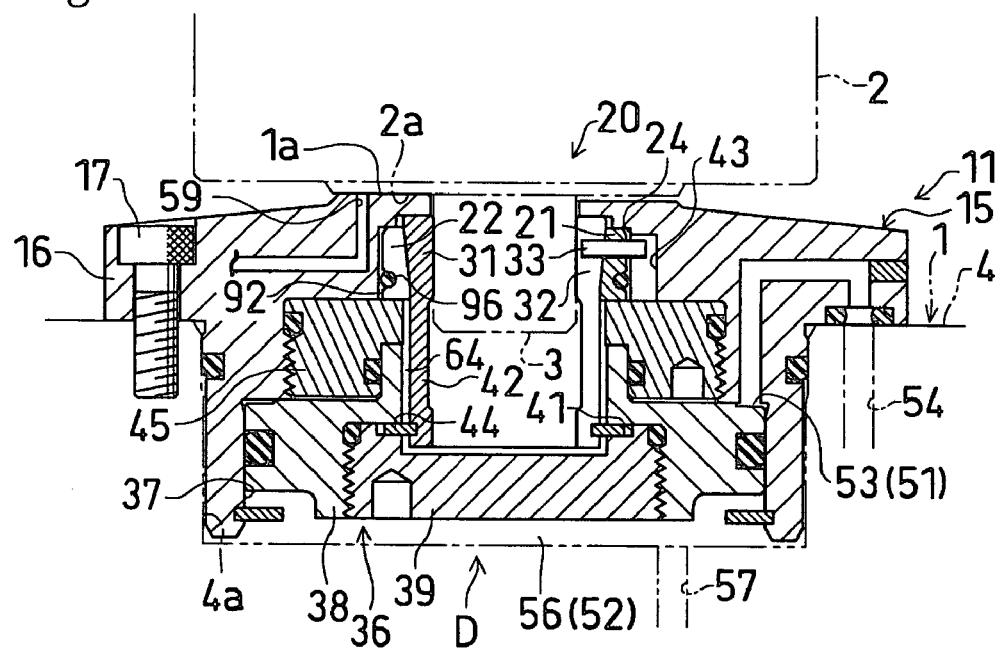
FIG. 28 is a view similar to FIG. 21A, showing a different mode of a first socket means of the sixth embodiment.

FIG. 28 is a view similar to FIG. 21A, showing a different mode of the first socket means 11 of the sixth embodiment.

In this mode, a rubber ring as a resistance means 96 is attached to an outer periphery of the outer sleeve 21. This resistance means 96 is adapted to increase resistance force when the outer sleeve 21 is diametrically expanded.

It is noted that plastic or metal can be employed as the resistance means 96, instead of the illustrated rubber. This resistance means 96 can be attached to an inner periphery of the guide hole 20 instead of (or in addition to) being attached to the outer periphery of the outer sleeve 21.

Seventh Embodiment

Figure 29:
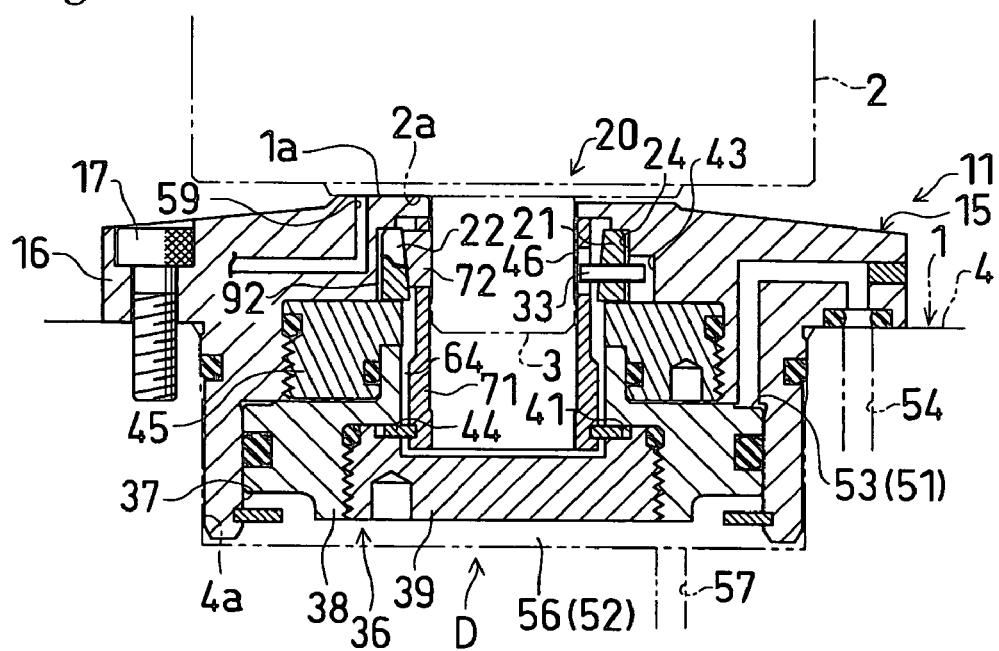
FIG. 29 is a view similar to FIG. 10A, showing a first socket means of a seventh embodiment of the present invention.

FIG. 29 is a view similar to FIG. 10A, showing a first socket means 11 of a seventh embodiment.

This seventh embodiment is an exemplified variation of the fifth embodiment (FIG. 10A). This seventh embodiment is different from the fifth embodiment in that, between the outer peripheral surface of the outer sleeve 21 and the inner peripheral surface 24 of the guide hole 20 is formed the annular gap 92, and the coned disc spring (advancing means) 25 arranged in the structure of FIG. 10A is omitted.

[Changed Modes]

The first through seventh embodiments and various exemplified variations of the present invention are shown above, and the present invention can be further changed as follows and carried out.

(1) In the clamping system, the number of socket means 13 having only a locking function may be only one instead of the illustrated two (FIG. 1), or may be three or more. The third socket means 13 is not limited to the illustrated structure of FIG. 7, FIG. 8 and the like, and another type of clamp may by employed as the third socket means 13. Furthermore, in a case that the lowering force of the inner sleeve 31 or the pressing members 72 during the locking driving is set to a sufficiently high value, it is also possible that the third socket means 13 is not at all provided.

(2) The drive methods of the socket means 11, 12 and 13 are all hydraulic double-acting methods in the embodiments described above, however, instead of these, a spring-lock and hydraulic-release method or a hydraulic-lock and spring-release method may also be employed. The pressurized fluid to be used for locking or releasing may be gas such as compressed air in place of the exemplified pressurized oil. The pressurized fluid supplied for cleaning (fluid to be supplied to the blow port 60) may be gas such as nitrogen or may be liquid such as cutting oil in place of the exemplified compressed air.

(3) In this clamping system, it is possible that a plurality of third socket means 13 described above are provided and a plurality of second socket means 12 described above are provided. Furthermore, it is also possible that either the first socket means 11 or the second socket means 12 is provided in plural while the other is not provided at all. The direction of arranging the plurality of socket means may be circumferential or straight.

(4) The support surfaces 1a may be provided on the base plate 4 instead of being provided on the upper surface of the flange 16 of the housing 15.

(5) The guide hole 20 is formed integrally with the housing 15, however, instead of this, the guide hole 20 may be formed in another member fixed to the housing 15.

(6) In addition, the housing 15 and the base plate 4 may be formed integrally with each other instead of being formed separately from each other.

(7) The combination of the reference block and the movable member may be a combination of a table of a machine tool and a work pallet, a combination of a work pallet and a jig base, a combination of a jig base and a work piece or a combination of a working jig such as a welding jig and a working article such as a work piece instead of the illustrated combination of the base plate 4 and the work pallet 2. The present invention can also be applied to the positioning of work piece, tools and the like of various kinds of processing machines such as laser processing machines and electric discharge processing machines.

(8) It is noted that, it is a matter of course that the clamping apparatus of the present invention can be used in one set instead of a plurality of sets as presented.

What is claimed is:

1. A clamping apparatus, wherein
a guide hole into which a plug portion of a movable member is allowed to be inserted is opened in a leading end portion of a reference block,
an outer engaging member is arranged inside the guide hole,
an inner engaging member which is diametrically expandable and diametrically contractible is arranged inside the outer engaging member, the inner engaging member is axially wedge-engaged with the outer engaging member, and the inner engaging member which is in the wedge-engaged state is adapted to be movable for locking toward a base end and in such a direction as to diametrically contract,
an output member is inserted into the reference block axially movably, and the output member is connected to either one of the inner engaging member and the outer engaging member,
the output member is allowed to be connected to a drive arrangement.

2. The clamping apparatus as set forth in claim 1, wherein an annular inner sleeve is employed as the inner engaging member.

3. The clamping apparatus as set forth in claim 2, wherein the outer engaging member is attached to at least one of the guide hole and the output member radially movably.

4. A clamping system using the clamping apparatus as set forth in claim 2, wherein
two of the plug portions are provided at a predetermined interval on the movable member,
the reference block is provided with a first socket arrangement and a second socket arrangement corresponding to the plug portions,
each of the first and second socket arrangements includes the guide hole, the outer engaging member and the inner sleeve,
the first socket arrangement is constituted in such a way that substantially the entire circumference of an outer peripheral surface of the outer engaging member is allowed to come into close contact with an inner peripheral surface of the guide hole, and
the second socket arrangement is constituted in such a way that a pair of projections radially facing each other are provided on at least any of an inner periphery of the guide hole, an outer periphery or an inner periphery of the outer engaging member and an outer periphery or an inner periphery of the inner sleeve, and escape grooves are formed between the projections.

5. The clamping system as set forth in claim 4, wherein
the movable member is provided with at least another plug portion, and
the reference block is provided with a third socket arrangement to be exclusively used for locking corresponding to said another plug portion.

6. The clamping system as set forth in claim 5, wherein
the third socket arrangement includes the guide hole, the outer engaging member and the inner sleeve,
the inner peripheral surface of the guide hole is prohibited to move radially with respect to the reference block, and
the outer engaging member is attached to at least one of the guide hole and the output member radially movably.

7. The clamping system as set forth in claim 5, wherein
the third socket arrangement includes the guide hole, the outer engaging member and the inner sleeve, and
the inner peripheral surface of the guide hole is allowed to move radially with respect to the reference block.

8. The clamping apparatus as set forth in claim 1, wherein
a plurality of pressing members arranged circumferentially at intervals are employed as the inner engaging member,
an annular socket into which the plug portion is allowed to be inserted is arranged inside the outer engaging member,
each of the pressing members is supported on a peripheral wall of the annular socket radially movably, and each of the pressing members is adapted to be movable radially outward by a return arrangement,and
the output member is connected to either one of the annular socket and the outer engaging member.

9. A clamping system using the clamping apparatus as set forth in claim 8, wherein
two of the plug portions are provided at a predetermined interval on the movable member,
the reference block is provided with a first socket arrangement and a second socket arrangement corresponding to the plug portions,
each of the first and second socket arrangements includes the guide hole, the outer engaging member, the annular socket and the plurality of pressing members,
the first socket arrangement is constituted in such a way that substantially the entire circumference of an outer peripheral surface of the outer engaging member is allowed to come into close contact with an inner peripheral surface of the guide hole and that three or more of the pressing members are arranged circumferentially at intervals, and
the second socket arrangement is constituted in such a way that two of the pressing members are arranged so as to radially face each other.

10. The clamping system as set forth in claim 9, wherein
the movable member is provided with at least another plug portion, and
the reference block is provided with a third socket arrangement to be exclusively used for locking corresponding to said another plug portion.

11. The clamping system as set forth in claim 10, wherein
the third socket arrangement includes the guide hole, the outer engaging member and the plurality of pressing members,
the inner peripheral surface of the guide hole is prohibited to move radially with respect to the reference block, and
the outer engaging member is attached to the guide hole radially movably.

12. The clamping system as set forth in claim 10, wherein
the third socket arrangement includes the guide hole, the outer engaging member and the plurality of pressing members, and
the inner peripheral surface of the guide hole is allowed to move radially with respect to the reference block.

13. The clamping apparatus as set forth in claim 1, wherein
the outer engaging member is adapted to be diametrically expandable and diametrically contractible.

14. The clamping apparatus as set forth in claim 1, wherein
the inner engaging member is advanced toward the leading end by an advancing arrangement, and in the locking movement, the inner engaging member moves toward the base end against the advancing arrangement while diametrically contracting.

15. The clamping apparatus as set forth in claim 1, wherein
the outer engaging member is adapted to be diametrically expandable and diametrically contractible, an annular gap is formed between the guide hole and the outer engaging member, and in the locking movement, the inner engaging member diametrically expands the outer engaging member and moves toward the base end while diametrically contracting.

16. The clamping apparatus as set forth in claim 1, wherein
the inner engaging member is wedge-engaged with the outer engaging member from a leading end side.

17. The clamping apparatus as set forth in claim 1, wherein
the inner engaging member is wedge-engaged with the outer engaging member from a base end side.

18. The clamping apparatus as set forth in claim 1, wherein
substantially the entire circumference of an outer peripheral surface of the outer engaging member is allowed to come into close contact with an inner peripheral surface of the guide hole.

19. The clamping apparatus as set forth in claim 1, wherein
a peripheral wall of the outer engaging member is provided with at least one slit so that the outer engaging member is diametrically contractible by its own elastic restoring force.

20. The clamping apparatus as set forth in claim 1, wherein
a pair of projections radially facing each other are provided on at least any of an inner periphery of the guide, an outer periphery or an inner periphery of the outer engaging member and an outer periphery or an inner periphery of the inner engaging member, and escape grooves are formed between the projections.

21. The clamping apparatus as set forth in claim 1, wherein
an inner peripheral surface of the guide hole is prohibited to move radially with respect to the reference block.

22. The clamping apparatus as set forth in claim 1, wherein
an inner peripheral surface of the guide hole is allowed to move radially with respect to the reference block.

* * * * *